United States Patent [19]

Plunkett

[11] 4,047,083
[45] Sept. 6, 1977

[54] ADJUSTABLE SPEED A-C MOTOR DRIVE WITH SMOOTH TRANSITION BETWEEN OPERATIONAL MODES AND WITH REDUCED HARMONIC DISTORTION

[75] Inventor: Allan Barr Plunkett, Erie, Pa.

[73] Assignee: General Electric Company, Erie, Pa.

[21] Appl. No.: 664,951

[22] Filed: Mar. 8, 1976

[51] Int. Cl.[2] .............................................. H02M 1/08
[52] U.S. Cl. .................................. 318/231; 318/230; 318/227; 363/41
[58] Field of Search ...................... 318/231, 230, 227; 321/9 A, 9 R, 5, 18

[56] References Cited

U.S. PATENT DOCUMENTS

| | | | |
|---|---|---|---|
| 3,611,086 | 1/1970 | Mokvytzki | 318/231 |
| 3,662,247 | 5/1972 | Schierman | 318/231 |
| 3,870,945 | 3/1975 | Pedersen et al. | 318/227 |

Primary Examiner—Herman J. Hohauser
Attorney, Agent, or Firm—A. S. Richardson, Jr.

[57] ABSTRACT

Alternating voltage for energizing an adjustable speed a-c motor is derived from unipolarity input voltage by means of electric power inverting apparatus comprising at least one pair of alternately conducting controllable electric valves. The conducting states of these valves are periodically switched by control means responsive to frequency and amplitude command signals, whereby the frequency and the amplitude of the fundamental component of the alternating voltage are varied as functions of the respective command signals. The control means includes means for implementing a triangle interception mode of pulse width modulation (PWM) of the alternating voltage so long as the amplitude command signal does not exceed a predetermined reference value (which is less than 1.0 per unit) and the speed of the motor does not exceed a predetermined reference speed, and the control means additionally includes means for implementing a "transition" PWM mode of operation whenever the amplitude command signal exceeds its reference value or the motor speed exceeds said reference speed. As disclosed herein the transition PWM mode implementing means is a dual d-c level set scheme in which the lower level is varied as a function of the higher level so as to minimize selected harmonics of the alternating voltage and the higher level is varied as a function of the amplitude command signal thereby to vary the amplitude of the fundamental voltage component, and means is provided for smoothly transitioning to a square wave mode of operation as the amplitude command signal approaches 1.0 per unit.

23 Claims, 17 Drawing Figures

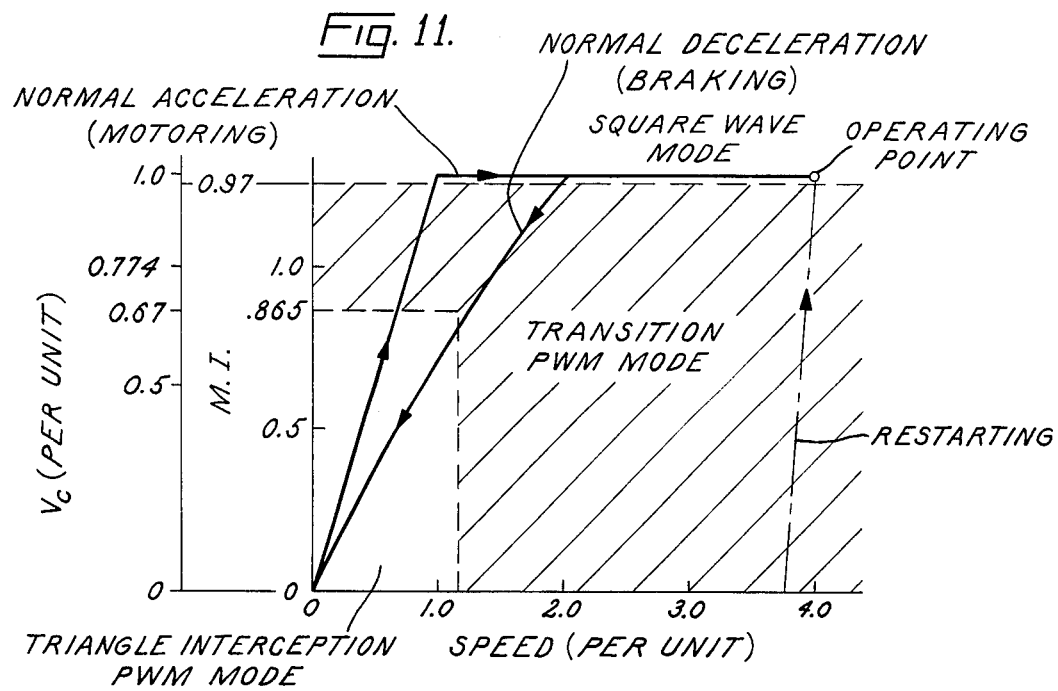
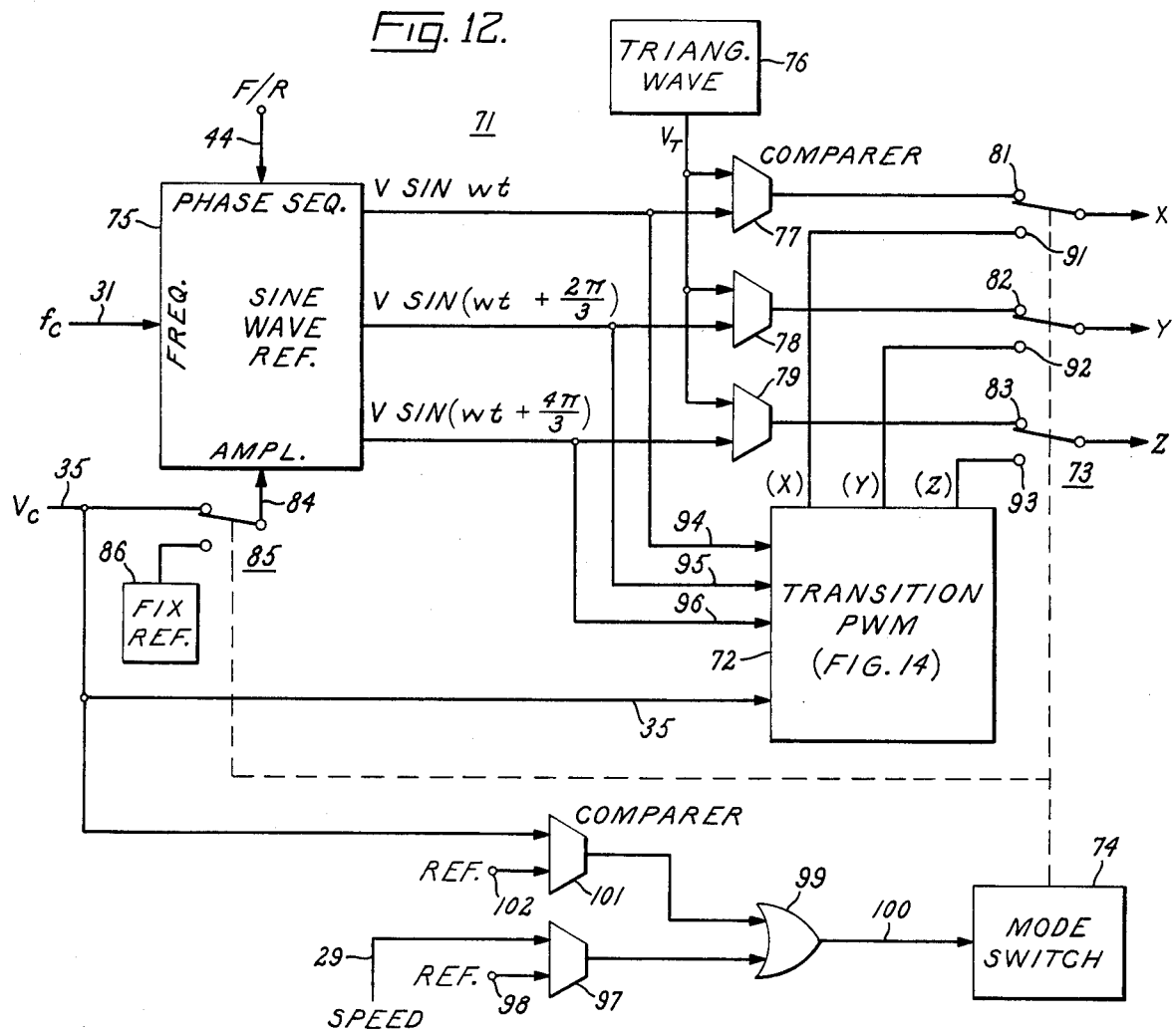

ADJUSTABLE SPEED A-C MOTOR DRIVE WITH SMOOTH TRANSITION BETWEEN OPERATIONAL MODES AND WITH REDUCED HARMONIC DISTORTION

BACKGROUND OF THE INVENTION

This invention relates generally to static electric power conversion apparatus of the inverter type, and more particularly it relates to improved control means for such apparatus capable of "driving" adjustable speed a-c motors.

In many applications of electric motors, alternating current induction motors are preferred to other kinds because of their relative simplicity, compactness, ruggedness, ease of maintenance, light weight, and low cost. The torque developed by an induction motor can be shown to be a function of both the amplitude-to-frequency ratio of the sinusoidal alternating voltage applied to its stator windings and the slip speed of the motor (i.e., the difference between the actual speed of the rotor surface and the angular speed of the stator flux wave, both expressed in terms of radians per second). Where such a motor is required to run at variable speeds, it is common practice to supply its windings with a-c power which is so conditioned that the frequency as well as the amplitude of the stator voltage are adjustable as desired. By suitably controlling these two parameters, the motor can be caused to operate, for example, with constant load torque for speeds between zero and a given corner point speed (i.e., the highest speed at which the motor flux can be held constant) and with reduced torque but substantially constant horsepower for a range of speed variations above the corner point speed, which characteristic is desirable in certain applications such as traction drives for electrically propelled rail vehicles.

Polyphase alternating voltage of variable amplitude and frequency can be advantageously derived from a given d-c power source, or from a fixed frequency a-c source, by using static electric power apparatus in which a plurality of pairs of alternately conducting controllable electric valves are interconnected and arranged so as to convert the voltage applied to the input terminals of the apparatus into polyphase output voltages suitable for energizing the stator windings of a 3-phase, adjustable speed electric motor. Typically the valves comprise unidirectionally conducting switching elements of the kind having the ability to hold off forward voltage until turned "on" in response to a suitable control or gate signal. One family of such elements is generally known by the names "controlled rectifier" or "thyristor," and I prefer to use this family in the present invention. Once triggered or "fired" by its control signal, a thyristor switches from a blocking or non-conducting state to a forward conducting state in which it can freely conduct motor current until this current is subsequently extinguished by the commutating action of external circuit components. A free-wheeling diode can be connected in inverse parallel relationship with each of the load current conducting thyristors in order to conduct motor current during intervals when the thyristor is reverse biased (i.e., anode potential is negative with respect to cathode).

There are many different circuit configurations and operating modes for power conversion apparatus wherein thyristors are used as the main switching elements. Such apparatus conventionally includes suitable firing and commutating means for periodically reversing or switching the conducting states of the respective thyristors in each of the alternately conducting pairs. By repeating this switching action for each thyristor pair in a predetermined cycle pattern and by staggering the patterns of the thyristor pairs associated with the respective phases of the motor, the desired 3-phase alternating voltages are developed at the output terminals of the apparatus. The frequency of the fundamental component of the output voltage waveform is determined by the frequency of the cyclic pattern of switching the thyristor pairs. The amplitude of the output voltage can be linearly varied with frequency either by correspondly varying the voltage applied to the input terminals of the conversion apparatus or, assuming that the magnitude of the input voltage is constant, by appropriately controlling the operation of the firing and commutating means in the apparatus itself. One of the most advantageous means of controlling the output voltage within the conversion apparatus is to utilize a switching time-ratio control technique.

One very effective system of the switching time-ratio type is known as multiple pulse width modulation (PWM). In this system the conducting states of each pair of alternately conducting thyristors are switched more than twice each half cycle of the motor voltage, thereby chopping the half cycle waveform into a series of discrete, relatively narrow pulses of alternately differing (e.g., positive and negative) potentials. The time durations or widths of the individual pulses and the number of pulses per half cycle of fundamental frequency are varied in accordance with a preselected control strategy so as to vary the average voltage applied to the motor, thereby varying the amplitude of the fundamental sinusoidal component of the motor terminal voltage as desired. The control strategy is preferably selected so that during each half cycle the train of rectangular output voltage pulses is modulated sinusoidally, and for this purpose a triangle interception mode of PWM has heretofore been proposed.

In the triangle interception mode of PWM, a sine wave reference signal (also referred to as the "modulation wave") of variable amplitude and frequency is compared with a triangular timing waveform (also referred to as the "carrier wave") having a constant amplitude and a frequency which is appreciably higher than that of the reference signal, and the conducting states of a thyristor pair are switched each time the timing waveform intercepts the reference signal. As a result, the fundamental component of the voltage at the associated output terminal has the same frequency and is approximately in phase with the sine wave reference signal, its amplitude is a linear function of the modulation ratio (i.e., the ratio of the reference signal amplitude to the timing waveform amplitude), and the number of pulses per half cycle of fundamental frequency is determined by the chopping ratio (i.e., the ratio of the frequency of the timing waveform to the frequency to the reference signal). So long as the chopping ratio is relatively high (e.g., greater than six), the harmonic distortion of the output voltage waveform is relatively low and the residual harmonics all have such a high order that they are virtually without influence on the average motor torque. Consequently the triangle interception technique of PWM avoids unacceptably large torque pulsations and harmonic losses in the motor when the adjustable speed drive is operating at speeds near zero. An example of such a scheme adapted for wide speed range motor drives is disclosed in Siemens-Zeitschrift 45 (1971) Heft 3, pages 154-61, "Pulswechselrichter zur Drehzahlsteuerung von Asynchronmaschinen" von Heintz, Tappeiner, und Weidelzahl. To avoid unwanted subharmonic voltage components or low frequency "beats" as the amplitude and frequency of the fundamental output voltage increase, it is common practice to synchronize the triangular timing waveform to the sinusoidal reference signal. But then it is necessary to increase the chopping ratio at the low end of the speed range in order to keep the frequency of the timing waveform sufficiently high to avoid excessive ripple current in the motor.

To obtain the maximum possible output voltage from any PWM conversion apparatus, the mode of operation must be changed to "square wave" wherein the thyristor pairs are switched only at half cycle intervals and all chops in between are dropped or omitted, whereby unmodulated square-wave voltages of fundamental frequency are applied to the respective motor terminals. This mode of operation results in the familiar 6-step voltage waveform across each of the stator windings of the adjustable speed, 3-phase induction motor (which windings conventionally are interconnected in a 3-wire star configuration so as to cancel third harmonics and multiples thereof throughout the whole speed range). Although the maximum output voltage waveform is known to contain 20% fifth harmonics and lesser percentages of seventh and higher harmonics, there are no perceptible torque pulsations because, with the adjustable speed drive now running at maximum voltage and relatively high fundamental frequency, the mechanical load driven by the motor and the motor rotor itself will have sufficient inertia to provide a smoothing effect. Operating in the square wave mode is desirable because it results in lower converter losses and permits reduction in equipment size.

In transitioning between the triangle interception PWM and the unmodulated square wave modes of operation, a problem exists because the interval between consecutive switching moments of a thyristor pair has a finite minimum limit (typically 100 to 300 microseconds) to allow time for seccessful commutation, and therefore the width of an output voltage pulse cannot be gradually varied between this limit and zero. Whenever a minimum-width pulse is dropped from or added to the output voltage waveform, a discontinuity occurs in the amplitude-to-frequency ratio of the output voltage and the motor is subject to a discrete surge of torque which may be objectionably large unless the change happened to occur in the vicinity of a zero crossing of the fundamental component of the output voltage. Also a phase change can occur which causes misalignment of inverter voltage with motor back emf and thus causes undesirable surge currents.

Others have previously suggested changing the modulation strategy of a PWM converter in a selected intermediate portion of the fundamental frequency range, which portion is disposed between the low end of the range where the basic triangle interception technique is effective and the high end of the range where the converter is operating in a square wave mode. Abbondanti and Nordby, in their paper entitled "Pulse Width Modulated Inverter Motor Drives with Improved Modulation" presented in October 1974 at the Ninth Annual Meeting of the IEEE Industry Applications Society in Pittsburgh, Pennsylvania (IEEE Conference Record 74CH)833-41A, pages 998-1006), disclose a series of transitional PWM modes wherein the timing waveform is synchronized to the reference signal, its frequency or slope is variously modified, and/or the amplitude of the reference signal is varied as necessary to reduce the number of chops to zero without discontinuity in the amplitude of the fundamental output waveform. Heintze et al, in their 1971 publication previously cited (see FIGS. 6 and 7), suggest replacing the triangle interception technique of PWM with an equivalent d-c level set method which automatically ensures both steady state and transient synchronization of the chops with the reference signal.

In the d-c level set mode of PWM, a sine wave reference signal (modulation wave) is compared with one or more voltage levels, and the conducting states of a thyristor pair are switched each time the reference signal crosses zero and each time its instantaneous magnitude equals a voltage level. By using this technique, the minimum-width pulses that are dropped from or inserted in the output voltage as its fundamental amplitude is changed are always the ones closest to the zero crossings of the fundamental waveform, and their effect on the effective value of the fundamental is therefore negligible.

SUMMARY OF THE INVENTION

A general objective of the present invention is the provision, for supplying alternating voltage of variable frequency and amplitude to an adjustable speed a-c motor, of improved static electric power conversion apparatus wherein there is a smooth transition between a triangle interception mode of PWM operation at relatively low frequencies and a square wave mode of operation at high frequencies, thereby minimizing torque pulsations and power losses in the motor.

Another object of the invention is to provide an improved adjustable speed motor drive in which a triangle interception mode of PWM operation is utilized at relatively low speeds and in which the need to synchronize the triangular timing wave is eliminated.

If, as can sometimes happen, the voltage supplied to an adjustable speed a-c motor were temporarily interrupted while the motor is running at high speed, care must be exercised when power is restored to the motor. To safely restart a motor while the driven load is still moving, it is good practice to reduce the amplitude of the fundamental component of the converter output voltage and to adjust its frequency to match that of the coasting motor. Otherwise there is likely to be an unacceptably high surge of current upon reenergizing the stator windings of the motor. A further object of this invention is to provide improved power conversion apparatus of the type referred to above in which restarting the motor after a temporary loss of power is facilitated.

In carrying out my invention in one form, at least three pairs of alternately conducting controllable electric valves are connected in parallel circuit relationship between relatively positive and negative d-c input terminals, and the junctions between valves forming the respective pairs are connected in turn to three separate a-c output terminals which are adapted to be connected to a variable frequency load such as an adjustable speed 3-phase induction motor. The conducting states of the valves in each pair of alternately conducting valves are periodically switched by the action of associated firing and commutating means in a manner to convert unipolarity voltage applied to the input terminals into alternating voltage at the output terminals. Control means is provided for governing the operation of the converter firing and commutating means so as to vary, as functions of variable frequency and amplitude command signals, the frequency and the amplitude of the fundamental component of the alternating output voltage. More particularly, the control means includes means for implementing a triangle interception mode of PWM and mode changing means responsive to the speed of the motor and to the value of the amplitude command signal. The mode changing means activates the triangle interception mode implementing means so long as the motor speed does not exceed a predetermined reference speed and the amplitude command signal does not exceed a predetermined reference value. This reference value of the amplitude command signal corresponds to a modulation index which is less than 1.0 and which preferably is less than that modulation index at which the shortest interval between consecutive switching moments of a valve pair equals the minimum limit thereof.

Whenever the amplitude command signal exceeds the aforesaid reference value or the motor speed exceeds the reference speed, the mode changing means is alternatively effective to activate means for implementing a transition mode of PWM. The latter means when active is keyed by a periodic reference signal (the frequency of which depends on the aforesaid frequency command signal) to cause the firing and commutating means to switch the conducting states of each valve pair at certain moments during each cycle of the fundamental component of the alternating voltage at the associated output terminal, the timing of a predetermined first switching moment in a half cycle of the fundamental voltage being established by the periodic reference signal and any subsequent switching moments in the same half cycle being synchronized therewith per a schedule comprising:

1. a moment following said first switching moment by a variable angle alpha ($\alpha$) measured in electrical degrees of a full cycle of fundamental voltage, 2. a moment following said first switching moment by another variable angle beta ($\beta$) measured in electrical degrees of a full cycle of fundamental voltage, $\beta$ being larger than $\alpha$ but less than 90°, 3. a moment occurring 180° -$\beta$ after said first switching moment, and 4. a moment occuring 180° -$\alpha$ after said first switching moment.

In accordance with my invention, a first function generator is provided for varying $\alpha$ as a function of $\beta$ in a manner which reduces peak harmonic current in the a-c motor, and a second function generator is provided for varying $\beta$ as a function of the amplitude command signal to thereby vary the amplitude of the fundamental component of output voltage. As the amplitude command signal is increased above the aforesaid reference value to its maximum value, the second function generator reduces $\beta$ to zero whereupon the converter proceeds to operate in a square wave mode.

In the event deenergization of the induction motor is desired or required for any reason, the converter is shut down by appropriately manipulating the firing and commutating means so that it turns off all of the converter valves in an orderly sequence, the amplitude command signal is reset to zero, and the frequency command signal is caused to track the actual speed of the motor. If normal operation of the firing and commutating means were resumed while the motor is still rotating at a speed higher than the reference speed, the converter will automatically restart in the transition mode of PWM. This is preferable to the triangle interception mode which, if implemented on restarting at relatively high speeds, would require synchronizing the triangular timing waveform to the sine wave reference signal and undesirably increasing the timing waveform frequency so that the chopping ratio does not fall below its acceptable minimum. The grosser harmonics that result can be readily tolerated at high frequencies.

In one aspect of my invention, the control means includes additional means operative when $\alpha$ is equal to or smaller than a predetermined value closely approaching 0° (which value preferably has a time duration approximately equal to the minimum permissible interval between consecutive switching moments of a valve pair) for eliminating the switching moments listed first and last in the above schedule, and the additional means includes means responsive to the periodic reference signal for preventing an initial operation thereof except during predetermined intervals which are spaced from the predetermined first switching moment by at least the aforesaid predetermined value. Similar means is provided for eliminating the other two switching moments in the schedule if and when $\beta$ is equal to or smaller than said predetermined value. This avoids sudden phase shifts in the output voltage as the operating mode changes between transition PWM and square wave due to variations of the amplitude command signal in the vicinity of its maximum value.

BRIEF DESCRIPTION OF THE DRAWINGS

My invention will be better understood and its various objects and advantages will be more fully appreciated from the following description taken in conjunction with the accomanying drawings in which:

FIG. 11 is a graph of amplitude command signal/modulation index vs. motor speed (in per unit of corner point speed) showing the different modes (triangular interception, transition, and square wave) that are traversed during motoring and braking operations of a motor drive embodying the present invention;

FIG. 12 is a functional block diagram of the waveform generator shown as a single block in FIG. 1, which generator includes means responsive to the amplitude command signal and to a motor speed signal for switching between the triangle interception and the transition modes of PWM in accordance with the present invention;

DETAILED DESCRIPTION

Figure 1:
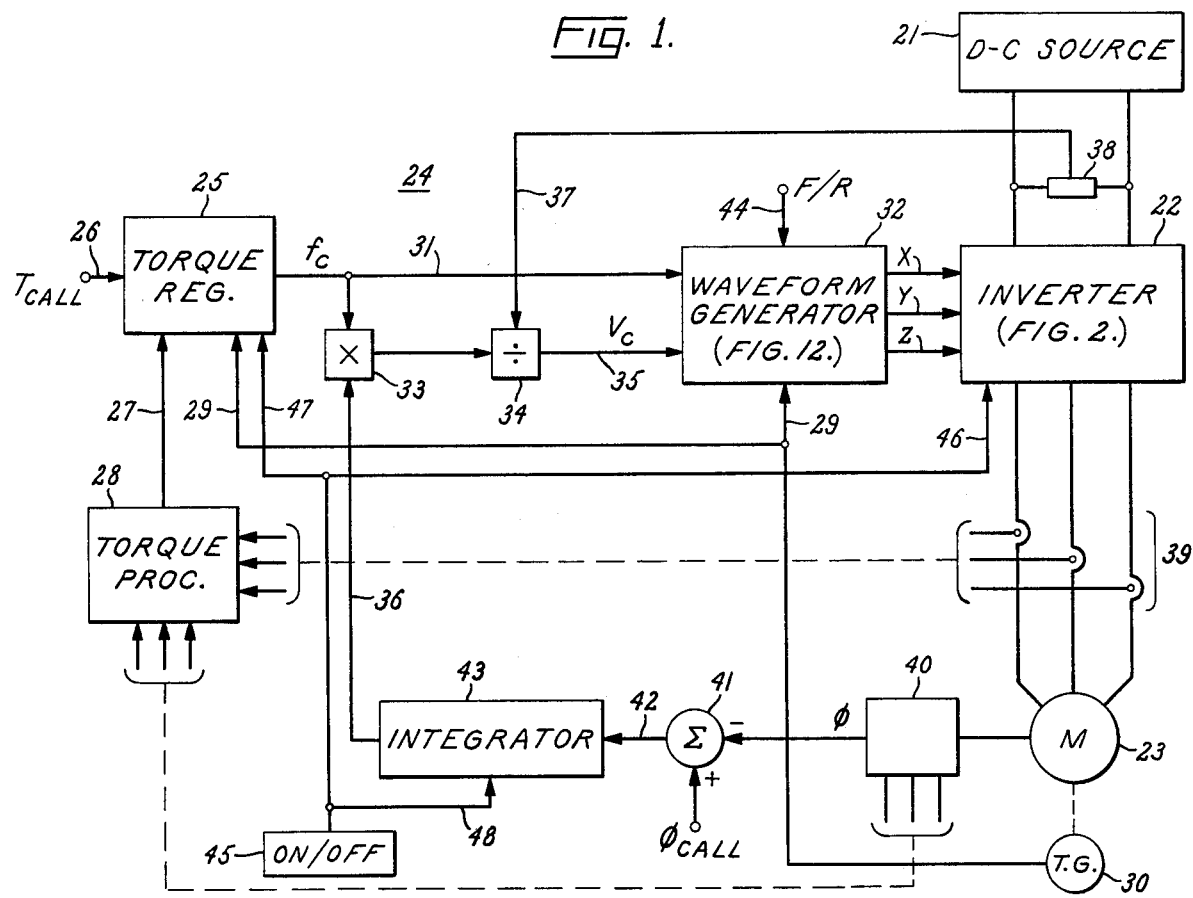
FIG. 1 is a block diagram of an adjustable speed motor drive embodying the present invention.

Referring now to FIG. 1, an adjustable speed motor drive is shown comprising the combination of a suitable d-c electric power source 21, conversion apparatus including an inverter 22 whose power input is taken from that source, and an adjustable speed a-c motor 23 having 3-phase stator windings which are energized by the output of the inverter 22 and a rotor coupled to a mechanical load such as the wheels of a traction vehicle (not shown). By appropriately varying the frequency and the amplitude of the excitation that the inverter 22 supplies to the stator windings of the motor 23, the motor can be propelled (motoring mode) or retarded (braking mode) as desired. Toward this end, the electric power conversion apparatus includes suitable means, indicated generally by the reference number 24 in FIG. 1, for regulating and controlling the operation of the inverter 22 in programmed response to a plurality of input signals comprising a first call signal $T_{CALL}$ representative of the desired motor torque, another call signal $\phi_{CALL}$ representative of the desired value of motor flux, and certain feedback signals representative of the actual responses of selected motor parameters, as is more fully explained below.

The illustrated regulating and control means 24 includes a torque regulator 25 which is fed via line 26 with the aforesaid torque call signal, via line 27 with a torque feedback signal representative of the actual value of torque developed by the motor 23 as derived by a torque processing circuit 28, and via line 29 with a speed feedback signal which is produced by suitable means, such as a tachometer generator 30, for sensing the actual angular velocity of the rotor of the motor 23. In response to these inputs the torque regulator 25 supplies directly to a first input line 31 of a waveform generator 32 a frequency command signal $f_C$ which will determine the fundamental frequency of a train of periodic control signals on each of three output lines X, Y, and Z. The control signal trains on the respective lines X, Y and Z are generated by the generator 32 in 120° staggered patterns to control the operation of firing and commutating means in the inverter 22, thereby enabling the frequency of the fundamental components of the 3-phase alternating voltages that the inverter applies to the terminals of the stator windings of the motor 23 to be varied as a function of the frequency command signal $f_C$ (see the description of FIG. 2 hereinafter).

The frequency command signal $f_C$ from the torque regulator 25 is also supplied to multiplying means 33 which, in cascade with dividing means 34, is coupled to a second input line 35 of the waveform generator 32. In the multiplier 33 the value of the frequency command signal is multiplied by that of an integrated flux error signal on line 36 which is derived, as will soon be described, from a comparison of actual and desired values of motor flux, and in the divider 34 it is divided by the value of a signal on line 37 which is proportional to the magnitude of the inverter input voltage as sensed by a voltage transducer 38 connected across the d-c input terminals of the inverter 22. Thus the signal appearing on line 35, hereinafter referred to as the amplitude command signal $V_C$, varies directly with the product of the frequency command signal $f_C$ on line 31 and the integrated flux error signal on line 36, and it varies inversely with the inverter input voltage signal on line 37. In a manner to be described hereinafter, the waveform generator 32 responds to the amplitude command signal by controlling the operation of the inverter firing and commutating means so as to vary, as a function of $V_C$, the amplitude of the fundamental components of the 3-phase alternating voltages that the inverter applies to the stator terminals of the motor 23. As a result, so long as the amplitude of the fundamental stator excitation voltage is under its maximum possible level and the actual value of motor flux is equal to a constant desired value, this amplitude will track the fundamental excitation frequency so as to maintain the volts-per-hertz ratio of the excitation voltage substantially constant.

The torque regulator 25 causes the frequency command signal $f_C$ to differ from the actual speed feedback signal in an amount and in a sense (which difference represents motor slip frequency) that minimizes any error between the motor torque feedback signal on line 27 and the torque call signal on line 26. The torque feedback signal is obtained from the aforesaid torque processing circuit 28 which preferably is constructed and arranged in accordance with the teachings of my co-pending U.S. patent application Ser. No. 568,120, filed on Apr. 14, 1975, and assigned to the assignee of the present invention. As is therein explained more fully, this component relies on stator excitation current feedback signals derived from an array of three current transformers 39 coupled to the respective conductors over which the inverter output is supplied to the three stator terminals of the motor 23, and it also relies on motor flux feedback signals derived from suitable means 40 for sensing the actual magnetic flux across the rotor-stator air gap inside the motor. The latter flux sensing means 40 is advantageously constructed in accordance with the teachings of a co-pending U.S. patent application Ser. No. 525,613 — Plunkett et al, filed on Nov. 20, 1974, and assigned to the assignee of the present invention.

The flux sensing means 40 is arranged to produce a feedback signal $\phi$ representative of the average value of actual motor flux, and this signal is supplied to a summing circuit 41 along with the flux call signal $\phi_{CALL}$. The summing circuit 41 derives on line 42 a flux error signal which depends on the difference, if any, between the actual and desired values of motor flux. As is more fully explained in the above-cited co-pending application Ser. No. 525,613 — Plunkett et al, the flux error signal on line 42 is integrated by an integrator 43, and the integrated error signal is supplied via line 36 to the multiplier 33. Consequently, the above-mentioned amplitude command signal $V_C$ on line 35 is increased or decreased in response to an error between actual and desired values of motor flux in order to change the fundamental amplitude of the stator excitation voltage as necessary to reduce the error to 0. The cross-connection of the frequency command signal $f_C$ from the frequency-control, torque regulating loop into the amplitude-control, flux regulating loop through the medium of the multiplier 33 greatly improves the stability of the motor control, especially during the braking mode of operation, and enables the amplitude-control channel to compensate for rapid speed changes without requiring fast control action in the flux regulating loop.

The direction of rotation of the a-c motor 23 depends on the phase sequence of the 3-phase alternating voltages which the inverter 22 applies to its stator terminals, which phase sequence corresponds to the sequencing of the control signal trains on the lines X, Y and Z from the waveform generator 32. To determine this sequence, a third input line 44 of the generator 32 is supplied with a forward-reverse command signal F/R. The generator is arranged to reverse the sequence from X-Y-Z to X-Z-Y in response to a commanded change from forward to reverse, and vice versa.

The inverter controls 24 as illustrated in FIG. 1 include shutdown means 45 (labeled "ON/OFF") coupled via line 46 to the firing and commutating means in the inverter 22, via lines 47 to the torque regulator 25, and via line 48 to the integrator 43. In its ON state the shutdown means 45 permits normal operation of all of these components. However, whenever it is desired or required to interrupt the excitation voltage that the inverter 22 is applying to the stator windings of the motor 23, the shutdown means 45 is activated to an OFF state, and while in this state it is effective to command the inverter firing and commutating means to turn off all of the main and auxiliary thyristors in the inverter 22 in an orderly sequence. So long as the shutdown means 45 remains in its OFF state, it is also effective to discharge the integrator 43, thereby clamping the integrated flux error signal on line 36 to zero and consequently resetting the amplitude command signal $V_C$ to zero, and it causes the torque regulator 25 to produce a frequency command signal $f_C$ having a value corresponding to the actual speed of the motor as determined by the speed feedback signal on line 29.

Figure 2:
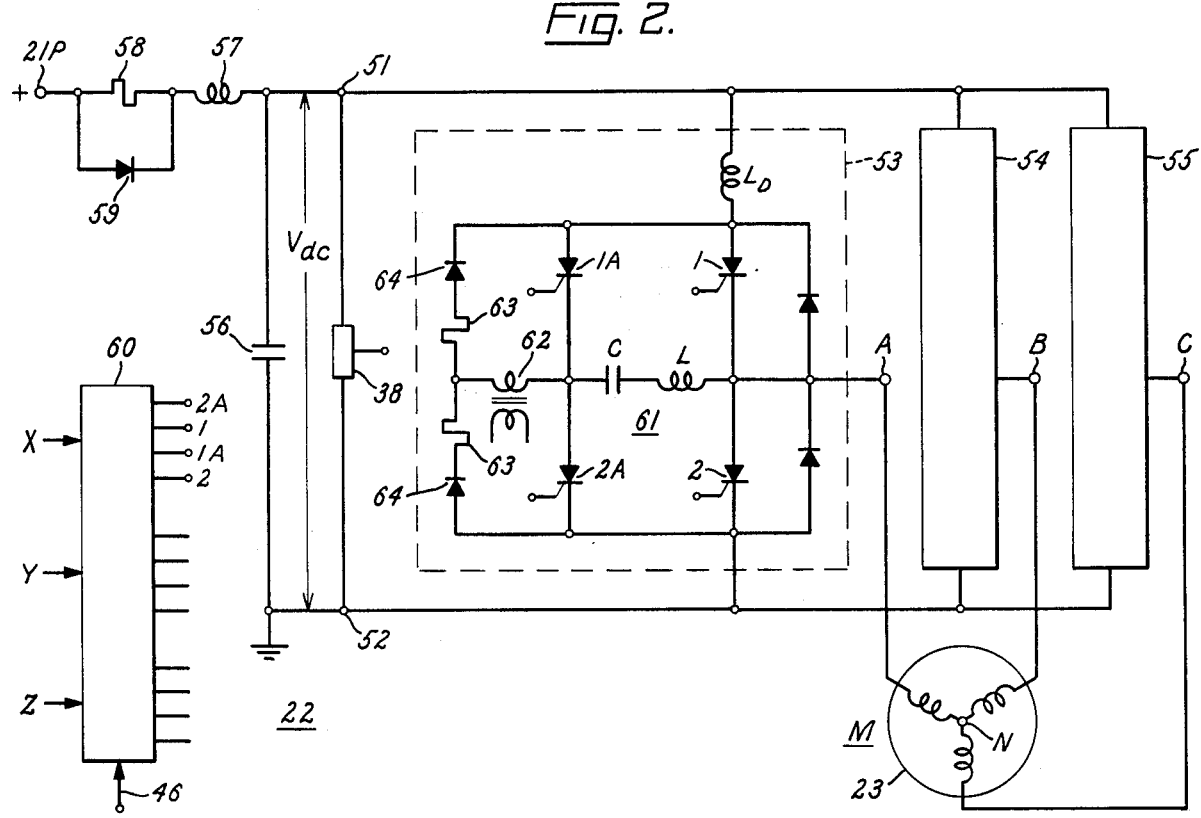
FIG. 2 is a schematic circuit diagram of a preferred embodiment of the 3-phase inverter shown as a single block in FIG. 1.

As was mentioned above, the signal trains on lines X, Y and Z control the operation of the firing and commutating means of the inverter 22. More details of the inverter 22 are shown in FIG. 2 where the inverter is seen to comprise a set of positive and negative d-c input terminals 51 and 52, three a-c output terminals A, B, and C, and a parallel array of three duplicate power circuit means 53, 54, and 55 for interconnecting the set of input terminals and the three output terminals, respectively. The associated d-c source 21 applies a unipolarity voltage $V_{d-c}$ to the d-c input terminals 51 and 52 of the inverter. A filter comprising a shunt capacitor 56 and a series inductor 57 is connected between the source and the inverter input terminals. In accordance with the teachings of my U.S. Pat. No. 3,890,551 granted on June 17, 1975, and assigned to the assignee of the present invention, there is preferably inserted between the inductor 57 and the associated source terminal 21P a regenerative voltage increasing means comprising a resistor 58 shunted by a diode 59 which is poled to force current to flow through the resistor 58 whenever $V_{d-c}$ exceeds source voltage, a condition which can exist during the braking mode of operation (i.e., retardation) of the adjustable speed motor drive. In FIG. 2 the potential of both the source terminal 21P and the corresponding inverter input terminal 51 is assumed to be positive with respect to ground, and the other input terminal 52 is preferably grounded.

The inverter output terminals A, B, and C are adapted to be connected, via conductors including the current transformers 39 (not shown in FIG. 2), to a variable frequency alternating current load M which in FIG. 2 is illustrated as three star-connected stator windings of an adjustable speed, 3-phase a-c motor 23. The motor 23 can be of any suitable type such as squirrel cage induction or synchronous reluctance and, although only a single motor is shown in FIG. 2, it should be understood that a plurality of similar motors can be energized from the same inverter 22 if desired. It should also be understood that additional inverter-motor combinations can be connected to the source terminal 21P in parallel with the apparatus shown in FIG. 2. While a 3-phase motor has been illustrated, the number of phases is not critical, and motors having single, double, six, or more phases can be alternatively used if desired.

Each of the power circuit means 53, 54, and 55 in the inverter 22 includes at least one pair of alternately conducting main thyristors which are suitably arranged and controlled to connect the corresponding output terminal A, B, or C to both of the input terminals 51 and 52 in a manner that converts the unipolarity input voltage $V_{d-c}$ into 3-phase alternating voltages at the output terminals. While alternative arrangements can be used if desired, the well known auxiliary-impulse commutation inverter configuration disclosed in U.S. Pat. No. 3,207,974 - McMurray granted on Sept. 21, 1965, and assigned to the assignee of the present invention is preferred. In FIG. 2 the power circuit means 53 has been illustrated as having such a configuration. More specifically, it comprises an inductor $L_D$ connected in series with a pair of load current conducting thyristors 1 and 2 between the relatively positive and negative d-c input terminals 51 and 52 to form a half bridge, with free wheeling diodes being respectively connected in inverse parallel relationship with the main thyristors. Of course if desired for higher current or voltage ratings, additional thyristors can be connected in parallel and/or in series and operated in unison with each of the main thyristors 1 and 2. The junction between the main thyristors 1 and 2 in the half bridge 53 is connected to the output terminal A which in turn is connected to the phase terminal associated with a first one of the three stator windings in the motor 23. The load current path is completed by way of the other windings of the motor stator, which windings share a neutral terminal N with the first stator winding and have separate phase terminals connected respectively to the output terminals B and C of the other two duplicate power circuit means or half bridges 54 and 55.

For purposes of alternately turning on and off the main thyristors 1 and 2 of the half bridge 53, firing means 60 and commutating means 61 are provided in the inverter 22. In accordance with the teachings of the above-cited McMurray patent, the commutating means 61 comprises a pair of commutating thyristors 1A and 2A serially connected between the inverter input terminals 51 and 52 and an impulse forming circuit comprising an inductor L connected in series with a charged capacitor C between the junction of the commutating thyristors 1A and 2A and the junction of the main thyristors 1 and 2. Both the main pair of thyristors 1 and 2 and the commutating pair of thyristors 1A and 2A are preferably silicon controlled rectifiers, and their respective gate electrodes are suitably coupled to correspondingly identified output terminals of the firing means 60. The firing means 60 comprises known components and circuits for selectively triggering the thyristors, on command of the periodic control signals supplied thereto on line X, in the following sequence:

I. Upon transition of the control signal on line X from a low or "0" state to a high or "1" state, (a) the commutating thyristor 2A is immediately fired to connect the LC impulse forming circuit across the main thyristor 2 which is consequently turned off, thereby extinguishing load current in the main thyristor 2 and isolating the inverter output terminal A from the grounded input terminal 52; (b) the main thyristor 1 is then fired to connect the positive input terminal 51 to the output terminal A, thereby enabling "forward" load current to commence flowing; and (c) the commutating capacitor C is recharged with opposite polarity (right-hand plate positive) and the commutating thyristor 2A is reverse biased by the ringing action of the impulse forming circuit.

II. Upon transition of the control signal on line X from a high or "1" state to a low or "0" state, (a) the opposite commutating thyristor 1A is innediately fired to connect the LC impulse forming circuit across the main thyristor 1 which is consequently turned off, thereby extinguishing load current in the main thyristor 1 and isolating the inverter output terminal A from the positive input terminal 51; (b) the complementary main thyristor 2 is then fired to connect the output terminal A to the grounded input terminal 52, thereby enabling "reverse" load current to commence flowing; and (c) the charge on the commutating capacitor C is again reversed (left-hand plate positive) and the commutating thyristor 1A is reverse biased by the ringing action of the impulse forming circuit. During each of these commutation processes, the rate at which load current can transfer from one main thyristor to the other is limited by the inductor $L_D$.

In summary it will be apparent that during periods when the control signal on line X is "1" the main thyristor 1 in the half bridge 53 is in a conducting state, the complementary thyristor 2 is in a non-conducting state, and the inverter output terminal A is at the same positive potential as the input terminal 51, whereas during periods when the same control signal is "0" the main thyristor 2 in the half bridge 53 is in a conducting state, the first thyristor 1 is in a non-conducting state, and the output terminal A is at ground potential. Thus the signal on line X causes the firing and commutating means 60, 61 to switch or reverse the conducting states of the two main thyristors 1 and 2 each time the signal changes state. The same switching action occurs in the half bridge 54 in response to the train of periodic control signals supplied over line Y to the firing means 60, and it also occurs in the half bridge 55 in response to the train of periodic control signals supplied over line Z to the firing means 60.

Because of the finite recovery time of thyristors that are commercially available today, there is a predetermined minimum limit (e.g., 300 microseconds) to the time interval between consecutive switching moments in each of the half bridges 53, 54, and 55. This establishes the maximum rate at which successive switching can occur without risking harmful "shoot through" of the commutating thyristors 1A and 2A. To guard against the possibility that the frequency of the periodic control signals on any or all of the lines X, Y, and Z may exceed this maximum rate, it is good practice to include suitable lock-out means in the firing means 60. A preferred embodiment of adaptive lock-out means is described and claimed in U.S. Pat. No. 3,919,620 — McMurray, Plunkett, and Stitt granted on Nov. 11, 1975, and assigned to the assignee of the present invention. As is more fully explained therein, the lock-out means is arranged to inhibit firing of each commutating thyristor throughout a period of time commencing when the opposite commutating thyristor is fired and terminating in delayed response to the subsequent detection of reverse bias on the latter thyristor. The onset of reverse bias is conveniently sensed by means of a current transformer 62 connected in a reset current path which comprises the series combination of a resistor 63 and a diode 64 across each of the commutating thyristors 1A and 2A. The diode 64 is poled inversely with respect to the parallel commutating thyristor so as to conduct commutating capacitor overcharge current. Current in the secondary winding of the transformer 62 provides an input to the adaptive lock-out circuit in the firing means 60.

Figure 3:
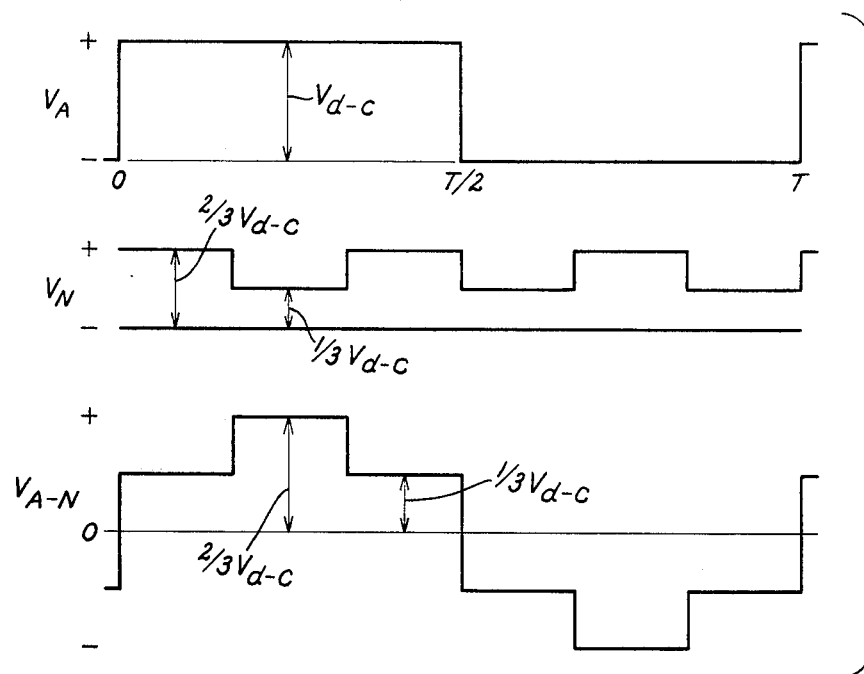
FIG. 3 is a time chart of the voltage which is applied, when the inverter is operating in a square wave mode, between a phase terminal (A) and neutral (N) of the stator windings of the adjustable speed a-c motor shown in FIG. 2.

In a square wave mode of operation, the control signals produced on each of the lines X, Y, and Z by the waveform generator 32 of the inverter controls 24 change states at intervals equal to half cycles of the desired fundamental frequency. The waveform of the resulting voltage $V_A$ at the inverter output terminal A for one full cycle of its fundamental component is shown by the first trace in FIG. 3. Similar voltages exist on the output terminals B and C, but due to the 120° staggered patterns of the control signals on lines Y and Z, the latter voltages will be phase displaced with respect to $V_A$ by 120 and 240 electrical degrees, respectively, of a cycle of fundamental frequency. The voltage $V_N$ at the ungrounded neutral terminal N of the stator windings, which voltage equals one-third the sum of the voltages at the inverter output terminals A, B, and C, is displayed in the second trace of FIG. 3. The resultant phase-to-neutral voltage impressed on each stator windings of the motor 23 is the familiar 6-step square wave shown by the third trace $V_{A-N}$ in FIG. 3, and the fundamental component of this waveform has the maximum amplitude that can be obtained from the inverter 22. (Note that the voltage scale of $V_{A-N}$ has been increased by a factor of 50% with respect to the scales of $V_A$ and $V_N$.)

Figure 4:
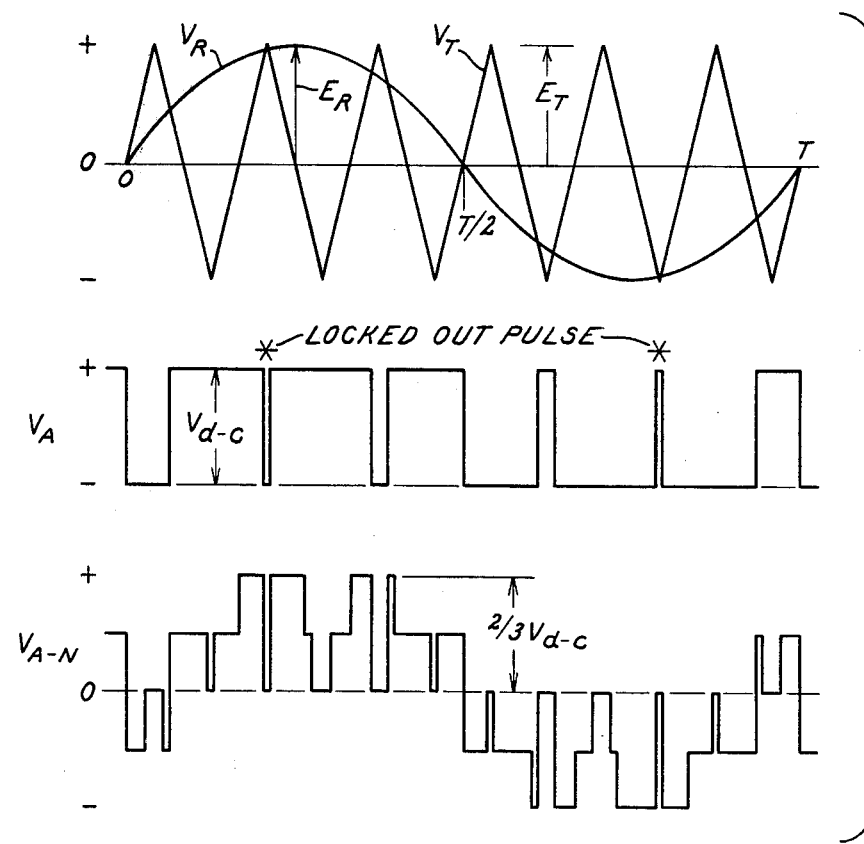
FIG. 4 is a similar chart of the motor voltage when the inverter is operating in a triangle interception mode of PWM, which chart also shows the corresponding sinusoidal reference signal ($V_R$) and a triangular timing waveform ($V_T$) for a modulation index of 1.0.

In a triangle interception made of PWM operation, the control signals on each of the lines X, Y, and Z change state many times during each cycle of the fundamental component of the output voltage, thereby chopping the voltage $V_A$ on the inverter output terminal A into a series of relatively narrow rectangular pulses of alternately positive and ground potential, with the periods or widths of successive pulses being varied in a generally sinusoidal pattern as is shown in FIG. 4. To implement this mode, the waveform generator 32 includes suitable means (such as shown, by way of example, in FIG. 12 which is described hereinafter) for generating first, second and third 120° phase-displaced sinusoidal reference signals each having an amplitude that depends on the amplitude command signal $V_C$ and a frequency that varies with the frequency command signal $f_C$, for comparing the reference signals with a triangular timing waveform having constant amplitude and a frequency which is appreciably higher than that of the reference signal, and for changing the states of the control signals on the respective lines X, Y, and Z each time the timing waveform intercepts the corresponding reference signal. This is illustrated in FIG. 4, above the trace of $V_A$, for one full cycle of the first reference signal $V_R$ which determines the states of the periodic control signal on line X and thereby controls the conducting states of the pair of main thyristors 1 and 2 in the first half bridge 53 of the inverter 22. For purposes of illustration it is assumed that the values of the frequency and amplitude command signals are such that the reference signal $V_R$ has a frequency just one-sixth that of the timing waveform $V_T$ (i.e., a chopping ratio of six) and an amplitude $E_R$ substantially equal to the timing waveform amplitude $E_T$ (i.e., a modulation index of 1.0).

In response to the timing waveform $V_T$ crossing the reference signal $V_R$ in a negative-going sense, the state of the control signal on line X is immediately changed from "0" to "1", thereby causing the inverter firing and commutating means to switch the conducting states of the main thyristor pair in the half bridge 53 so that the voltage $V_A$ on the output terminal A rises from ground to positive potential. Similarly, each time $V_T$ crosses $V_R$ in a positive-going sense, the state of the control signal on line X is immediately changed from "1" to "0", thereby switching the conducting states of the same thyristor pair so that $V_A$ falls from positive potential to ground. However, as noted by the asterisks in FIG. 4, there are two interceptions of the illustrated waveforms where the resulting state change is delayed by the action of the lock-out means included in the firing means 60 of the inverter 22, thereby producing a pulse of predetermined minimum width which prevents shoot through of a commutating thyristor pair due to consecutive switching moments occurring too close together.

The second and third sinusoidal reference signals in the generator 32 have the same frequency and amplitude a $V_R$ but lag it, respectively, by intervals of 120 and 240 electrical degrees of a cycle of fundamental frequency. Consequently the voltages on the inverter output terminals B and C look like $V_A$ but are displaced therefrom by 120° and 240°, respectively. The resulting phase-to-neutral stator excitation voltage is represented by the trace $V_{A-N}$ in FIG. 4. It will be apparent that the frequency of the fundamental sinusoidal component of this voltage is the same as the frequency of the sine wave reference signal $V_R$.

Figure 5:
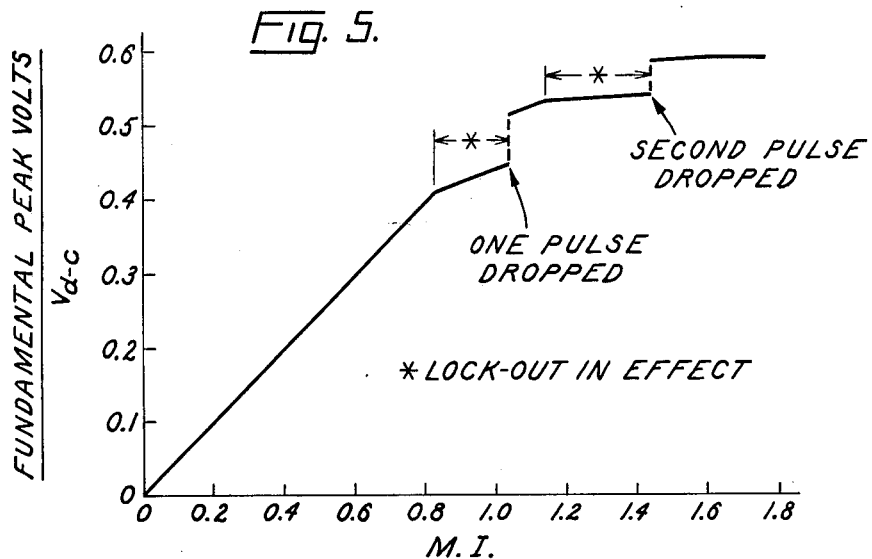
FIG. 5 is a graph of the amplitude of the fundamental component of output voltage (in per unit) vs. the modulation index of an inverter operating in the triangle interception mode of PWM.

FIG. 5 shows how the ratio of the amplitude of the fundamental component of $V_{A-N}$ to the magnitude $V_{d-c}$ would vary with the modulation index (M.I.) if the triangle interception mode of PWM were used over an M.I. range from 0 to 1.8. Recalling that the modulation index varies with the amplitude $E_R$ of the reference signal $V_R$ and that $E_R$ in turn depends on the amplitude command signal $V_C$, it will be understood that M.I. is directly proportional to $V_C$. FIG. 5 illustrates that the transfer characteristic between the value of the amplitude command signal and the actual amplitude of the fundamental output voltage of the inverter while operating in the triangle interception mode of PWM will be desirably linear for all variations of M.I. below a number (approximately 0.82) at which the aforesaid lock-out function keeps the shortest pulse width from becoming narrower than a predetermined minimum limit, and it becomes non-linear for variations above that number where the lock-out function is in effect. As M.I. increases above approximately 1.1, there is one cycle of the timing waveform $V_T$ near the peak of each half cycle of the reference signal $V_R$ that fails to intercept the reference signal, and therefore one minimum-width pulse is dropped from the mid region of each half cycle of $V_{A-N}$. This produces a step increase of approximately 15 percent in fundamental amplitude and results in an unacceptably abrupt surge of motor torque. Such a discontinuity can be reduced to a negligible factor by changing to a d-c level set mode of PWM the basic principle of which is illustrated in FIG. 6 for a half cycle of fundamental frequency.

Figure 6:
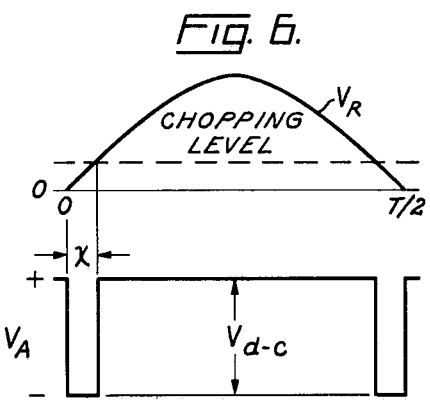
FIG. 6 is a time chart of a half cycle of voltage at the output terminal of one phase of an inverter operating in a d-c level set mode of PWM, showing also the corresponding sine wave reference signal ($V_R$) and the voltage level with which it is compared.

The output voltage waveform $V_A$ shown in FIG. 6 is produced by switching the main thyristor pair in an inverter half bridge each time a sine wave reference signal $V_R$ crosses zero and each time its instantaneous magnitude equals the magnitude of a single voltage level (labeled "chopping level" in FIG. 6). In this case the frequency of $V_R$ varies with the frequency command signal $f_C$ but its amplitude is constant, whereas the chopping level is intended to be varied as an inverse function of the amplitude command signal $V_C$. The width $x$ of the pulses that are chopped out of the output voltage waveform $V_A$ at the beginning and end of each half cycle of $V_R$ will vary with the chopping level. When the amplitude command signal is maximum (one per unit), $x$ is zero and the inverter operates in its square wave mode in which the amplitude of the fundamental component of the phase-to-neutral output voltage is maximum. As $x$ increases, the fundamental voltage decreases in the manner shown by the trace $n = 1$ in FIG. 7 which also displays the RMS values of the fifth, seventh, and eleventh harmonic components of the output voltage vs. $x$ (expressed in electrical degrees of a cycle of fundamental frequency). Assuming a fundamental frequency of approximately 62.5 Hz, a minimum pulse width of 300 microseconds (as determined by the aforesaid lock-out means) corresponds to approximately 7°, and this representative minimum limit of $x$ has been illustrated in FIG. 7. It will be apparent that at $x = 7°$ the value of the fundamental output voltage is nearly the same as the maximum value of this voltage when $x = 0$, and the discrepancy therebetween is too small to cause a perceptible problem when driving a motor. This is because the minimum-width pulses occur in close proximity to the zero crossings of the fundamental waveform, and therefore their omission or addition produces negligible discontinuity in the fundamental component of the stator excitation voltage.

Figure 7:
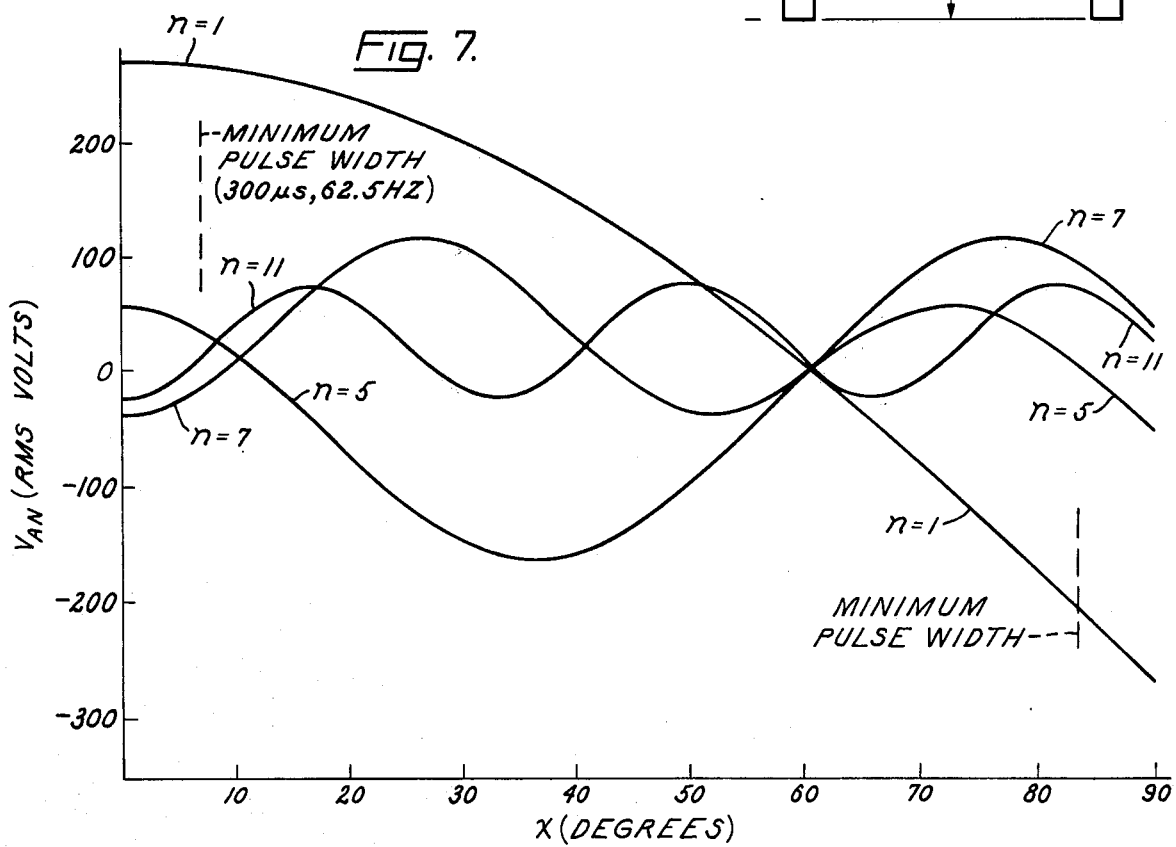
FIG. 7 is a graph of the fundamental and various harmonic components of the phase-to-neutral output voltage (RMS volts) vs. the pulse width $x$ shown in FIG. 6 for an inverter operating in the d-c level set mode of PWM.
Figure 8:
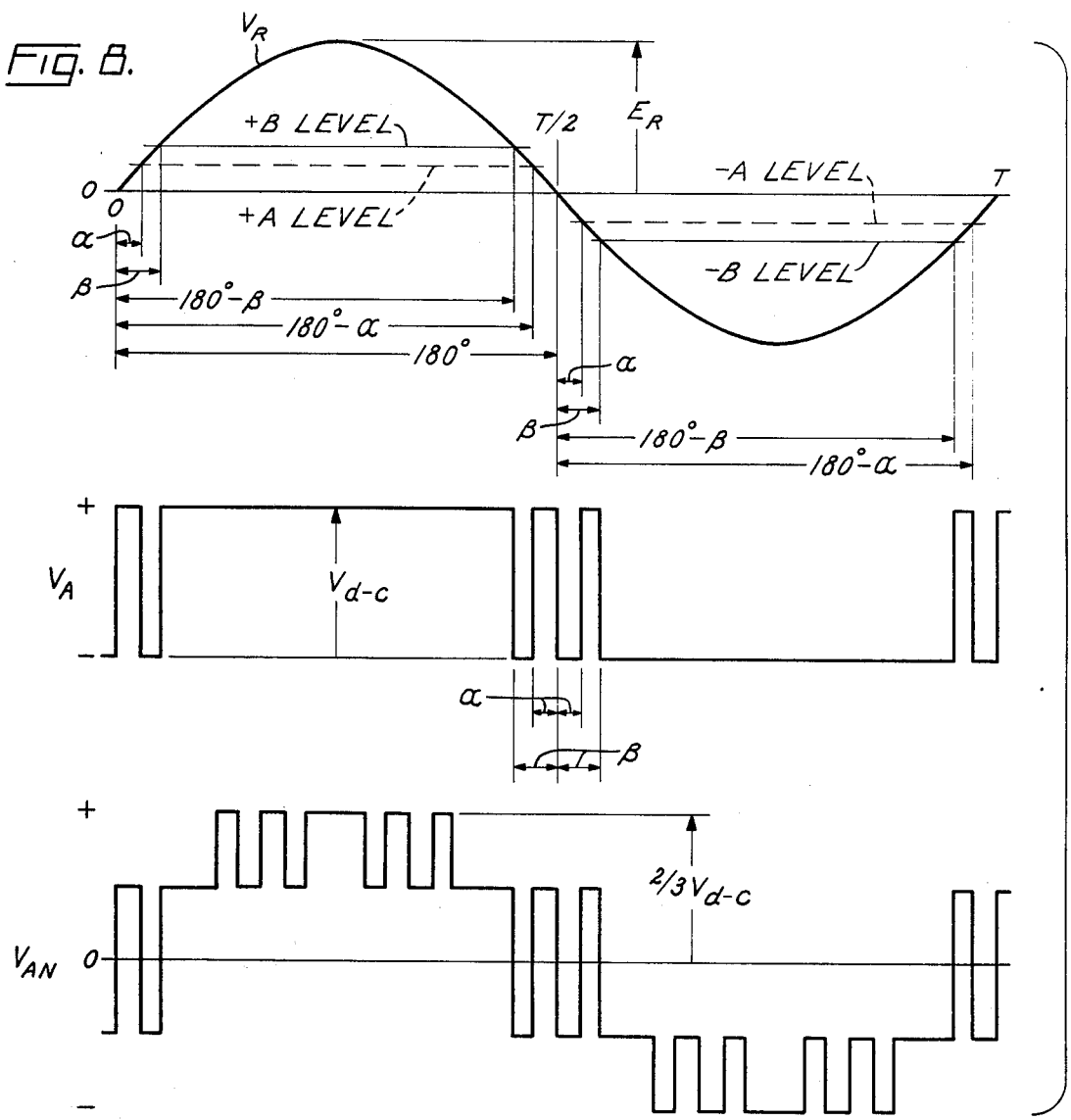
FIG. 8 is a time chart of output voltage when the inverter is operating in a d-c level set mode of PWM similar to FIG. 6 but with dual chopping levels instead of a single one.

In order to reduce the fifth and seventh harmonic voltages illustrated in FIG. 7, a more elaborate d-c level set mode of PWM utilizing dual chopping levels can be employed. See FIG. 8 where the dual chopping levels are labeled "A level" and "B level," respectively, the former level being lower than the latter. As before, thyristor pair switching occurs each time the fundamental frequency sine wave reference signal $V_R$ crosses zero and each time its instantaneous magnitude equals that of either reference level A or B. The resulting voltage waveform at one output terminal A of the inverter is shown by the trace $V_A$ in FIG. 8. It comprises a sequence of five pulses during each half cycle of the reference signal $V_R$. The first and last pulses in each half cycle have a width $\alpha$ corresponding to the angle of the reference waveform at which the instantaneous magnitude of $V_R$ just equals the A level, and the second and fourth pulses or notches in each half cycle have a width $\beta - \alpha$, where $\beta$ corresponds to the angle of $V_R$ at which its instantaneous magnitude just equals the B level. It will be understood that voltages identical to $V_A$ but lagging it by 120° and 240° of the fundamental are produced at the other two output terminals B and C, respectively, and therefore the phase-to-neutral stator excitation voltage $V_{A-N}$ is as shown in FIG. 8. Note that the fundamental component of $V_{A-N}$ agrees with the reference signal $V_R$ both in frequency and in phase.

In constant frequency inverters having output voltage waveforms of the same general configuration as $V_A$ in FIG. 8, it has previously been suggested that selected harmonic components of this voltage can be reduced by judiciously choosing the angles $\alpha$ and $\beta$. See the paper by F. G. Turnbull entitled "Selected Harmonic Reduction In Static D-C - A-C Inverters," 83 IEEE TRANS on Com. & Electron. pp. 374-78 (July 1964) which teaches that the fifth and seventh harmonic voltages can be reduced to zero if $\alpha = 16.25°$ and $\beta = 22.07°$ This is confirmed in a paper by Patel and Hoft entitled "Generalized Techniques of Harmonic Elimination And Voltage Control In Thyristor Inverters: Part I - Harmonic Elimination, " IA-9 IEEE TRANS on Ind. App. pp. 310--17 (May/June 1973). The authors of these papers did not contemplate any variations of the chosen angles for the purpose of controlling the fundamental voltage amplitude.

In accordance with a preferred embodiment of the present invention, as will be explained more fully hereinafter in connection with the descriptions of FIGS. 12 and 14, suitable means are included in the waveform generator 32 for implementing a novel "transition mode" of PWM similar to that illustrated in FIG. 8 whenever the modulation index of the triangle interception mode exceeds a predetermined number approaching 1.0. In the transition mode of the present invention, $\alpha$ is varied as a function of $\beta$ in order to minimize selected harmonics of the output voltage, while $\beta$ is varied as a function of the amplitude command signal so as to vary the amplitude of the fundamental component of the output voltage linearly with $V_C$. The presently preferred functions are displayed in FIGS. 9 and 10, respectively.

The function relating $\alpha$ to $\beta$ has been selected so as to reduce the peak harmonic current in the stator windings of the a-c motor 23 over the operating range of the transition mode of PWM. Reducing peak harmonic current will advantageously relieve thermal duty imposed on the motor, relieve commutating duty imposed on the inverter 22, and increase the electrical efficiency of the adjustable speed motor drive system. Either experimental or analytical techniques can be used to derive the particular functional relationship that will best accomplish this purpose. In one practical embodiment of my invention, the function was derived with the aide of a computer suitably programmed to read out the peak motor currents for various values of $\alpha$ and $\beta$ that produce a given amplitude of fundamental output voltage. The function $\alpha = f(\beta)$ was then chosen so that the minimum possible peak motor current was obtained for any output voltage, and this optimum function has been illustrated by way of example in FIG. 9 of the present application. More details of this particular technique have been published in a paper written jointly by the applicant and G. B. Kliman and entitled "Development of a Modulation Strategy for a PWM Inverter Drive," which paper was present on Oct. 2, 1975, in Atlanta, Georgia, at a meeting sponsored by the IEEE Industry Applications Society (pp. 915-21 of Conference Record 75CH0999-31A).

Figure 9:
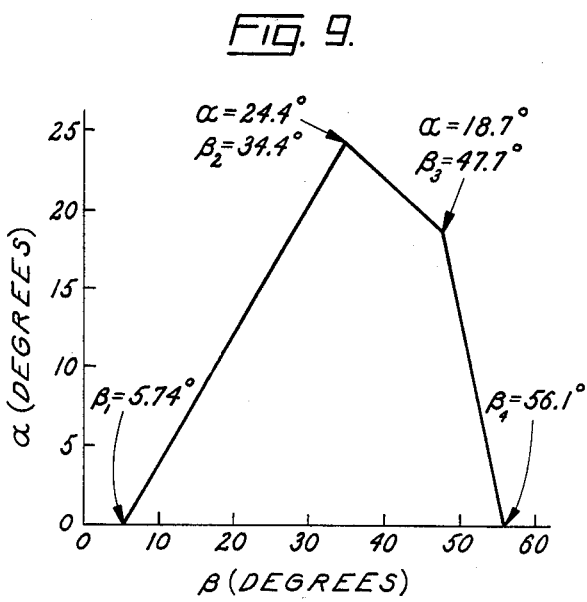
FIG. 9 is a graph of the width ($\alpha$, scaled in electrical degrees) of the first pulse vs. the cumulative width ($\beta$, also scaled in electrical degrees) of the first and second pulses in each half cycle of the PWM voltage depicted in FIG. 8, with $\alpha$ being shown to vary as a predetermined function of $\beta$ which function, in the preferred embodiment of the present invention, is selected so as appreciably to reduce the peak harmonic motor currents attributable to the fifth and seventh harmonics illustrated in FIG. 7.

As can be seen in FIG. 9, $\alpha$ increases with $\beta$ for values of $\beta$ less than a predetermined angle $\beta_2$ (e.g., 34.4°) and decreases as the value of $\beta$ increases above $\beta_2$. More specifically, as $\beta$ increases from a small angle $\beta_1$ (e.g., 5.74°) to the aforesaid predetermined angle $\beta_2$, $\alpha$ increases proportionately from zero to a maximum angle (e.g., 24.4°) which is approximately two-thirds of $\beta_2$, and as $\beta$ further increases from $\beta_2$ to a relatively large angle $\beta_4$ (e.g., 56.1°), $\alpha$ decreases from maximum to zero. Preferably the decreasing side of the relationship has two slopes as shown, with the break point therebetween occurring at the exemplary coordinates $\beta_3 = 47.7°$ and $\alpha = 18.7°$.

Figure 10:
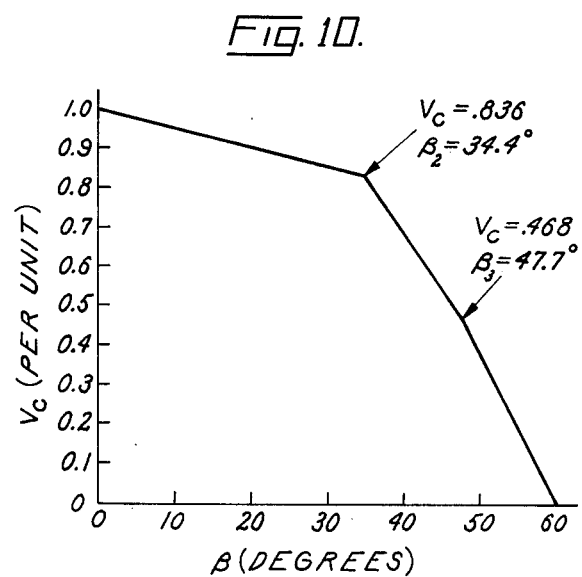
FIG. 10 is a graph of $\beta$ vs. the voltage amplitude command signal ($V_C$, in per unit), with $\beta$ being shown to vary as a predetermined function of $V_C$ which function, in the preferred embodiment of the present invention, is selected so that the amplitude of the fundamental output voltage varies substantially linearly with the amplitude command signal.

In FIG. 10 there is shown, by way of example, a functional relationship between $\beta$ and $V_C$ that will effect a transfer characteristic between the value of the amplitude command signal and the actual amplitude of the fundamental output voltage of the inverter while operating in the transition mode of PWM that substantially matches the linear transfer characteristic obtained during operation in the triangle interception mode of PWM. This function is a composite of three progressively steeper slopes intersecting, respectively, at a first break point having the exemplary coordinates $V_C = 0.836$ and $\beta_2 = 34.4°$ and at a second break point having the exemplary coordinates $V_C = 0.468$ and $\beta_3 = 47.7°$. As illustrated in FIG. 10 when $V_C$ is 1.0 per unit, $\beta$ has a minimum angle of 0°, and when $V_C$ is zero $\beta$ has a maximum angle of 60°.

As will soon be described in more detail, the waveform generator 32 of the inverter controls 24 includes means responsive to both the amplitude command signal and the speed feedback signal for controlling the transition or change between the triangle interception mode of PWM and the transition mode of PWM. The mode changing means is effective to activate the triangle interception mode implementing means in the waveform generator so long as $V_C$ does not exceed a predetermined reference value (which corresponds to a modulation index less than 1.0) and the speed of the motor 23 does not exceed a predetermined reference speed (which preferably is somewhat over the corner point speed), and it is alternatively effective to activate the transition mode implementing means in the same waveform generator whenever $V_C$ exceeds that reference value or the motor speed exceeds that reference speed.

The resulting performance of the adjustable speed motor drive is graphically illustrated in FIG. 11. The amplitude command signal $V_C$ as well as the corresponding modulation index M.I. are scaled along the ordinate of FIG. 11, while the motor speed (in per unit of corner point speed) is scaled along the abscissa. The reference value of $V_C$ is assumed to be 0.67 per unit, which is less than the value of the quantity (e.g., 0.774) at which the modulation index is 1.0 Consequently, as the motor accelerates from rest during its propulsion (motoring) mode of operation, the operating mode of the inverter is changed from triangle interception PWM to transition PWM at a frequency and at a modulation index sufficiently low so that no pulse is dropped in the triangle interception mode of PWM. As a result, synchronization of the chopping frequency to the fundamental frequency is not required in the latter mode, and the change to transistion PWM mode takes place smoothly without a perceptible surge of motor torque.

As is shown in FIG. 11, the transistion mode of PWM is traversed as the motor continues to accelerate toward its corner point speed. Concurrently the amplitude command signal $V_C$ (which tracks the frequency command signal at speeds below the corner point speed) increases from its predetermined reference value (e.g., 0.67 per unit) toward its maximum value (1.0 per unit), whereby $\beta$ is reduced in accordance with the function displayed in FIG. 10 and the amplitude of the fundamental output voltage continues to increase linearly with speed. As the corner point speed is approached, $V_C$ attains a value (e.g., 0.97 per unit) at which $\beta$ is equal to a predetermined value closely approaching 0°, and means responsive to this event is provided (see the later description of FIG. 14) for eliminating all chops in the output voltage waveform, whereupon the inverter commences to operate in its square wave, maximum voltage mode. The last-mentioned means includes means for enhancing the smoothness of this transition to square wave mode. From its corner point speed the motor will accelerate with constant excitation voltage (and therefore with decreasing flux) until a maximum speed is reached, which point is illustrated in FIG. 11, by way of example, as being four times the corner point speed.

In FIG. 11 the trace labeled "restarting" illustrates the case where excitation voltage is reapplied to the stator windings of the motor 23 after being temporarily interrupted due to operation of the shutdown means 45 which is included in the inverter controls 24. It is assumed that the motor is running at a speed in the vicinity of 3.75 per unit at the same time the shutdown means 45 reverts to its ON state. Since this speed exceeds the aforesaid reference speed, the transition mode of PWM will be active throughout the restarting process even though the amplitude command signal $V_C$ was recycled to zero. The transition mode is preferred to the triangle interception mode when restarting from relatively high speeds because in the latter mode, at such speeds, the chopping frequency would have to be synchronized with the fundamental frequency. The need for synchronization is also avoided during normal deceleration (retardation or braking mode of operation) when, as is illustrated in FIG. 11, the motor is likely to be running at a speed in excess of the reference speed (e.g., 1.17 per unit) as $V_C$ decreases below its reference value (e.g., 0.67).

A preferred embodiment of the waveform generator 32 will now be described with reference to FIG. 12 where it is seen to comprise means 71 for implementing the triangle interception mode of PWM, means 72 for implementing the transition mode of PWM, and mode changing means shown symbolically as a 3-pole double throw switch 73 actuated by a mechanism 74 labeled "mode switch."

The triangle interception mode implementing the means 71 includes a suitable source 75 of 3-phase sine wave reference signals of variable amplitude and frequency, a source 76 of a triangular waveform timing signal $V_T$ of constant amplitude and relatively high frequency, and an array of three duplicate comparers 77, 78, and 79 which compare the timing signal $V_T$ with the respective reference signals and supply either a "1" or a "0" signal to associated terminals 81, 82, and 83 of the three-pole switch 73, depending upon whether the corresponding reference signal is more positive or more negative than the timing waveform. So long as the contacts of the switch 73 are in the positions shown in FIG. 12, the outputs of the comparers 77, 78, and 79 are respectively connected to the output lines X, Y, and Z of the waveform generator, thereby activating the triangle interception mode implementing means 71. In this mode the train of alternate "1" and "0" signals which is supplied by each of the comparers 77, 78, and 79 comprises the previously mentioned periodic control signals on the corresponding line X, Y, or Z.

The sinusoidal reference signal source 75 is so constructed and arranged as to generate three signals which in FIG. 12 are identified as $V\sin \omega t$, $V\sin[\omega t + (2\pi/3)]$, and $V\sin(\omega t + 4\pi/3)$, respectively. The phase sequence of the second and third signals would be reversed from that indicated if the F/R signal supplied to the input line 44 of the source 75 were changed from "forward" to "reverse." The angular frequency $\omega$ of all three reference signals varies with the frequency command signal $f_C$ supplied to the input line 31. The amplitude V of each sinusoidal reference signal is determined by the value of a signal supplied to another input line 84 of the source 75, which line is connected to a selector switch 85. The selector switch 85, which is actuated comtemporaneously with the mode changing means 73, 74, is effective when the triangle interception mode implementing means 71 is active to connect the line 84 to the input line 35 on which the variable amplitude command signal $V_C$ is supplied, and it is alternatively effective when the transition PWM mode implementing means 72 is active to connect the same line 84 to means 86 for supplying a fixed reference or bias signal of predetermined magnitude.

Preferably the reference signal source 75 comprises the combination of a 3-phase square wave generator, three up/down binary counters, an equal number of Read Only Memory circuits, a plurality of exclusive OR circuits, and three digital-to-analog converters which can be interconnected and arranged in a manner similar to that shown in U.S. Pat. No. 3,904,949 to generate the desired 3-phase reference signals having essentially sinusoidal waveforms. It should be understood, however, that other sine wave generating circuits can alternatively be used (see, for example, U.S. Pat. No. 3,641,566 - Konrad et al), and the details of the circuits chosen for this purpose are immaterial as far as the present invention is concerned.

The triangular waveform source 76 is so constructed and arranged as to generate a timing waveform $V_T$ having a predetermined constant amplitude and a fixed frequency. The amplitude of $V_T$ is the same as the amplitude called for by the amplitude command signal $V_C$ when the signal has a predetermined value (e.g., 0.774 per unit) which is less than its maximum value. The frequency of $V_T$ is sufficiently high so that the peak ripple current in the motor will not exceed an acceptable limit which optimally equals the peak ripple current obtained when the inverter is running in a square wave mode. Furthermore, in order to avoid undesirable phase modulation when operating in the triangle interception mode of PWM, the timing waveform $V_T$ has a frequency at least six times as high as the fundamental frequency of the sine wave reference signals when the amplitude command signal is at its assumed reference value of 0.67. Consequently it is unnecessary to synchronize the timing waveform to the sine wave reference signals. The frequency of $V_T$ was advantageously fixed at 300 Hz in one practical embodiment of the invention.

Any time the actual speed of the motor exceeds its selected reference speed, the mechanism 74 of the mode changing means in the waveform generator 32 responds by changing the position of the movable contacts of the 3-pole switch 73 so as to disconnect the output lines X, Y, and Z from the switch terminals 81, 82, and 83 and to connect them instead to terminals 91, 92, and 93 which are respectively associated with output lines (X), (Y), and (Z) of the transition PWM mode implementing means 72. At the same time, the position of the movable contact of the selector switch 85 is changed so as to disconnect the sine wave amplitude determining input line 84 from the variable amplitude command signal line 35 and to connect line 84 instead to the means 86 for supplying the fixed bias signal of predetermined magnitude. While for the sake of drawing simplicity the switches 73 and 85 have been shown in FIG. 12 as being of the electro-mechanical type, in practice their switching functions are preferably performed by equivalent solid-state circuits. In any event, it should be understood that the above-described response is effective to deactivate the triangle interception mode implementing means 71 and to activate the transition PWM mode implementing means 72. The predetermined reference speed at which this mode change occurs preferably is selected to be higher than the corner point speed but no higher, in terms of equivalent frequency (i.e., the fundamental frequency of the stator excitation voltage), than one-sixth the frequency of the triangular timing waveform $V_T$.

Figure 14:
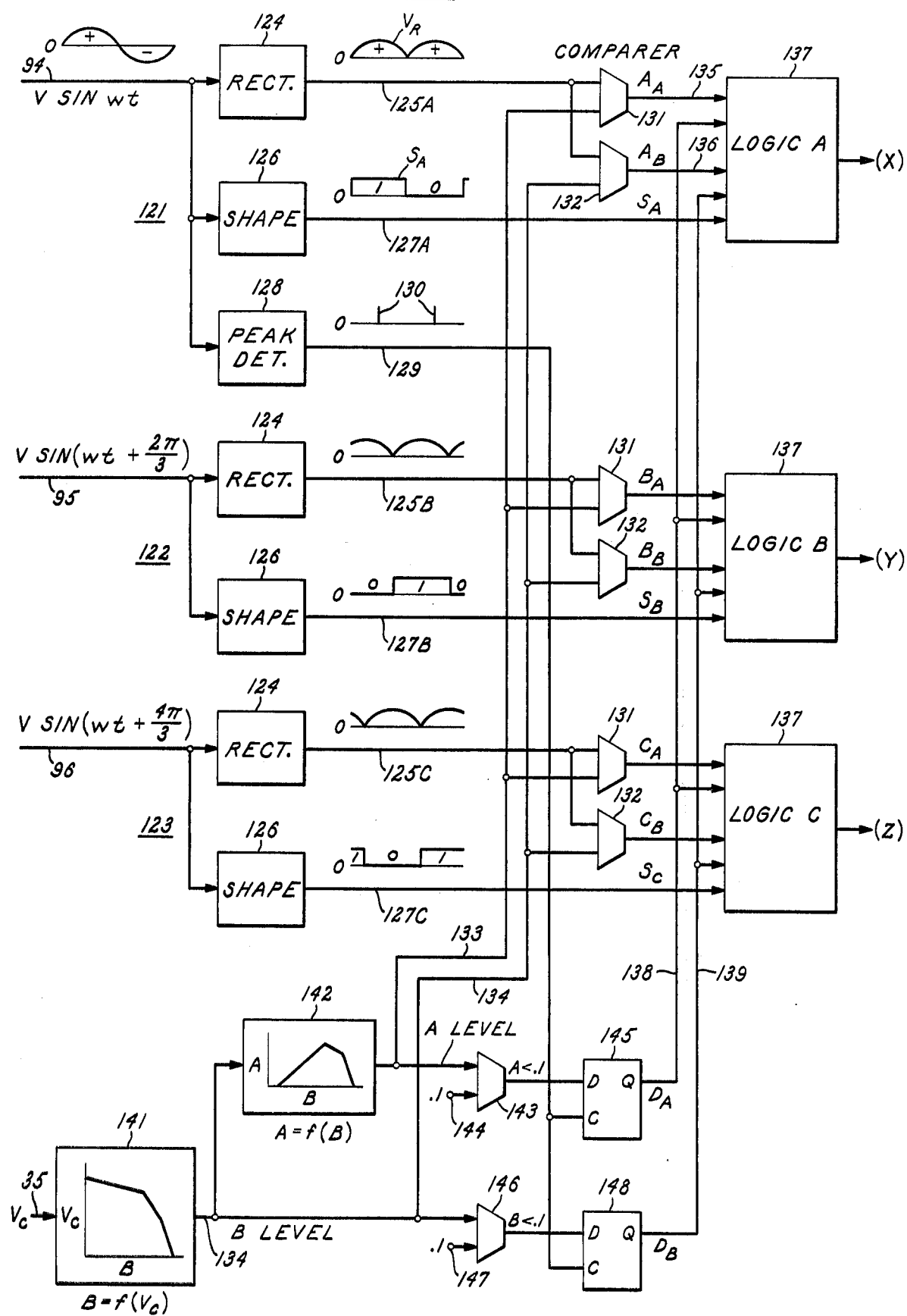
FIG. 14 is a functional block diagram of a practical embodiment of a circuit, illustrated as a single block in FIG. 12, for implementing the transition mode of PWM in accordance with the present invention, which circuit incorporates a dual d-c level set mode and functional relationships similar to those illustrated in FIGS. 8, 9, and 10, respectively.

The inputs to the transition PWM mode implementing means 72, a preferred embodiment of which will soon be described in conjunction with the description of FIG. 14, comprise the amplitude command signal $V_C$ which is supplied thereto on line 35 and the three sine wave reference signals which the source 75 supplies thereto via lines 94, 95, and 96, repectively. It should be noted that when the means 72 is active the frequency of the sine wave reference signals continues to vary with the frequency command signal $f_C$ but the amplitude of these signals is constant as determined by the fixed reference 86.

To sense when the motor exceeds its predetermined reference speed, a comparator 97 is provided. The comparator 97 has one input connected to the speed feedback signal line 29 and a second input connected to a reference or bias signal terminal 98. The reference signal at terminal 98 has a fixed value equal to that of the speed feedback signal when the actual motor speed just equals the selected reference speed. The output state of the comparter 97 is either high ("1") or low ("0"), depending on whether the value of the feedback signal does or does not exceed that of the reference signal.

The output of the comparer 97 is connected through an OR logic circuit 99 to an input line 100 of the mode switching mechanism 74. Another comparer 101 also has its output coupled through the OR logic 99 to the line 100. The latter comparer is provided to sense when the amplitude command signal $V_C$, which is connected to one of its inputs, exceeds a predetermined reference value. Toward this end a second input of the comparer 101 is connected to a terminal 102 to which a reference or bias signal is supplied, and the latter signal is given a value equal to the desired reference value of $V_C$. This reference value is less than the aforesaid predetermined value of $V_C$ (e.g., 0.774 per unit) which calls for a sine wave amplitude equal to the amplitude of the timing waveform $V_T$. In the illustrated embodiment of the present invention the reference value of $V_C$ is assumed to be 0.67 per unit which corresponds to a modulation index of 0.865. When $V_C$ does not exceed this reference value, the output of the comparer 101 is in a "0" state, and for higher values of $V_C$ this ouput is in a "1" state.

The mode changing means 73, 74 will have the disposition shown in FIG. 12 so long as there is a "0" signal on the input line 100. But a "1" on this line from either comparer 97 or 101 will cause the mechanism 74 to change the position of the movable contacts of the switch 73, thereby inactivating the triangle interception mode implementing means 71 and activating the transition PWM mode implementing means 72 as previously explained. Preferably the comparers 97 and 101 are designed with a-c hysteresis so as to maintain the mode changing means in the latter state, once it has effected activation of the transition PWM mode implementing means 72, for at least a predetermined length of time. By thus preventing immediate reactivation of the triangle interception mode implementing means 71, oscillation between modes is desirably avoided. Such oscillations might otherwise occur if $V_C$ were traversing its reference value at a relatively slow rate or if the speed of the motor were traversing the reference speed at a relatively slow rate.

Figure 13:
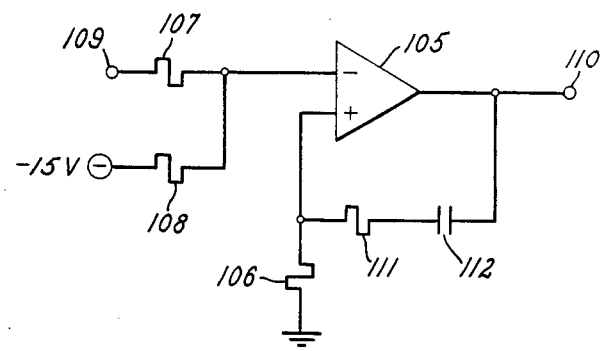
FIG. 13 is a schematic diagram of circuit details included in a preferred embodiment of a comparer associated with the mode switching means of FIG. 12.

In a preferred embodiment of the present invention, each of the comparers 97 and 101 is of an analog comparing type, and the desired hysteresis is provided by utilizing the circuit details shown in FIG. 13 which will now be described. This circuit comprises an operational amplifier 105 having a non-inverting terminal which is connected via a resistor 106, to a common potential bus (shown grounded) of a suitable source of d-c control power, and having an inverting terminal connected to the junction of two resistors 107 and 108 which are serially connected between an input terminal 109 and a relatively negative potential bus (e.g. −15V) of the control power source. With a positive signal of variable magnitude applied to the input terminal 109, the operational amplifier 105 will develop at an output terminal 110 a bistable signal whose state depends on whether the magnitude of the variable input signal does or does not exceed a certain reference or threshold level which is determined by the ratio of the ohmic resistance values of resistors 107 and 108. The output and the non-inverting input of the operational amplifier 105 are interconnected by positive feedback means. The positive feedback means comprises a resistor 111 in series with a capacitor 112, and it responds to each abrupt change of state of the bistable output signal on terminal 110 by transiently altering the threshold level of the comparer in a latching sense, thereby preventing the output signal from changing state again for at least a predetermined minimum length of time. As used in the comparers 97 and 101, the time constant of the positive feedback means 111, 112 is preferably selected so as to ensure that the state of the output signal, once changed from high to low or vice versa, is sustained for approximately 250 milliseconds.

FIG. 14 shows in simplified form a practical embodiment of the transition PWM mode implementing means 72. Preferably this embodiment incorporates a dual d-c level set mode of PWM, and therefore reference can be made to the previously described FIG. 8 in order to facilitate an understanding of its operation. The 3-phase sinusoidal reference signals from the sine wave reference source 75 in the waveform generator 32 (which signals, it will be recalled, have a frequency that varies with the frequency command signal $f_C$ but an amplitude that is constant when the transition mode implementing means is active) are respectively supplied over the input lines 94, 95, and 96 to three separate channels 121, 122, and 123 in the illustrated transition mode implementing means. As indicated in FIG. 14, the first channel 121 includes full-wave rectifying means 124 for supplying on a line 125A a reference signal $V_R$ comprising a succession of relatively positive half cycles having undulating magnitudes which conform to the wave shape of the first sinusoidal reference signal $V\sin\omega t$ on line 94, zero-crossing detecting means 126 for reshaping the first sinusoidal reference signal into a rectangular waveform signal $S_A$ on line 127A, the alternate high ("1") and low ("0") states of $S_A$ coinciding, respectively, to the positive and negative half cycles of the first signal, and suitable detecting means 128 for deriving on line 129 a train of clock pulses 130 coinciding approximately to the peaks of successive half cycles of the first signal on line 94.

The rectified reference signal on line 125A is supplied as a first input to a pair of comparers 131 and 132 in the first channel 121. The comparer 131 receives as a second input, on a line 133, a first variable bias signal (identified in FIG. 14 as the "A level"), and the companion comparer 132 receives as a second input, on a line 134, a second variable bias signal (identified as the "B level") which is greater than the A level. The comparer 131 derives at its output line 135 a periodic signal $A_A$ having alternate "1" and "0" states depending upon whether the instantaneous magnitude of the corresponding reference signal $V_R$ on line 125A is higher or lower than the A level. Similarly, the comparer 132 derives on its output line 136 a periodic signal $A_B$ having alternate "1" and "0" states, depending upon whether the same reference signal is higher or lower than the B level. The output lines 135 and 136 are both connected to a "logic A" unit 137 in the channel 121.

The logic A unit 137 is supplied not only with the periodic signals $A_A$ and $A_B$ over lines 135 and 136, respectively, but also with the rectangular waveform signal $S_A$ over line 127A. In addition, by way of lines 138 and 139, respectively, this unit is supplied with supervising signals $D_A$ and $D_B$ about which more will soon be said. The logic A unit 137 is suitably constructed and arranged to generate at its output line (X) a train of alternate "1" and "0" signals in accordance with the truth table displayed in FIG. 17.

Figure 17:
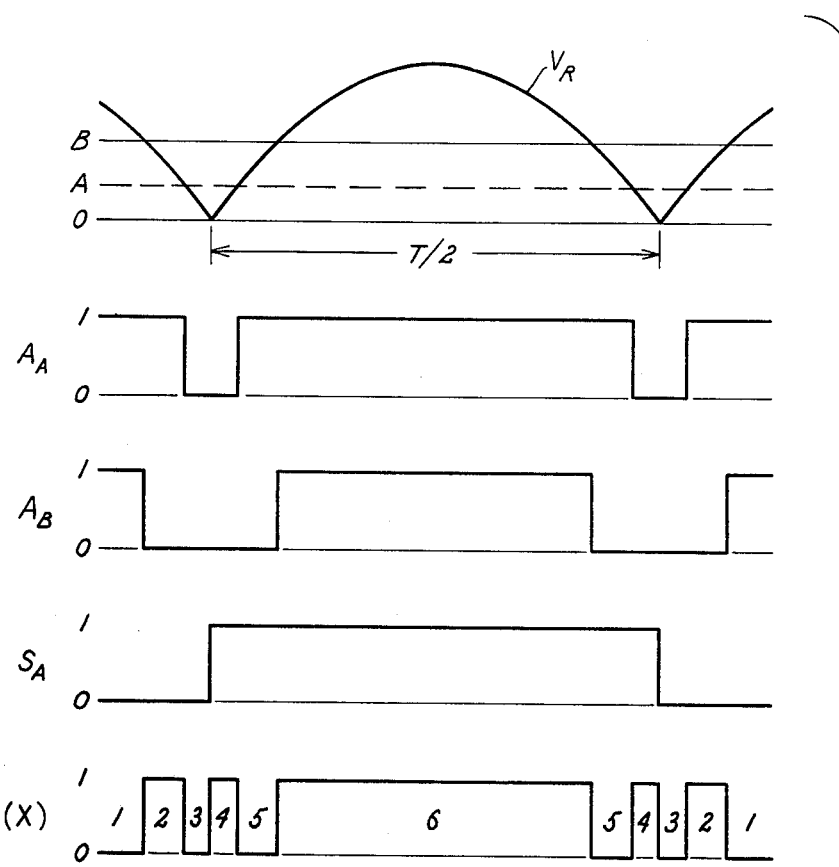
FIG. 17 is a time chart of various signals which are present in the transition PWM circuit shown in FIG. 14 and also a truth table of the various states of each logic component shown as a single block in FIG. 14.

It will be apparent in FIG. 17 that so long as both of the supervising signals $D_A$ and $D_B$ are "0" the output signals on line (X) comprise a series of five discrete pulses per half cycle of the sine wave reference signal. The first pulse has the same state as the rectangular waveform signal $S_A$ with which it commences. The width of this pulse is determined by the rectified reference signal $V_R$ intercepting the variable bias level A. The second pulse has a state opposite to that of $S_A$, and it terminates with the interception of $V_R$ and the variable bias level B. The fourth and fifth pulses in each half cycle are mirror images of the second and first pulses, respectively. When the transition PWM mode implementing means is active, the resulting train of pulses on the output line (X) of the channel 121 comprises the previously mentioned periodic control signals on the corresponding line X of FIGS. 2 and 12. Consequently the firing and commutating means 60, 61 of the inverter 22 are caused to switch the conducting states of the pair of main thyristors 1 and 2 in the first half bridge 53 at the beginning of each half cycle of the fundamental component of the inverter output voltage $V_A$ and at subsequent moments during the same half cycle in accordance with the following schedule (see FIG. 8):

1. a moment following the first switching moment by the variable angle $\alpha$,
2. a moment following the first switching moment by the variable angle $\beta$ which is always larger than $\alpha$ but less than 90°,
3. a moment occurring 180° -$\beta$ after the first switching moment, and
4. a moment occurring 180° -$\alpha$ after the first switching moment. In this schedule $\alpha$ is the arcsine of the ratio of the variable bias level A to the constant amplitude $E_R$ of the reference signal $V_R$, and $\beta$ is the arcsine of the ratio of the variable bias level B to $E_R$. This is illustrated, by way of example, in FIG. 8 which shows an $\alpha$ of 10° corresponding to an A level of 0.175$E_R$ and a $\beta$ of 17.5° corresponding to a B level of 0.3$E_R$.

With two exceptions the other two channels 122 and 123 of the transition PWM mode implementing means shown in FIG. 14 are the same as the channel 12 just described. The two exceptions are that the other two channels omit the peak detecting means 128, and the sinusoidal reference signals supplied to their input lines 95 and 96 lag the first signal on line 94 by 120° and 240°, respectively. Consequently the patterns of the trains of periodic control signals on the output line (Y) of the logic B unit in channel 122 and on the output line (Z) of the logic C unit in the channel 123 are correspondingly displaced with respect to the train of signals on the output line (X).

In accordance with the present invention, the amplitude of the fundamental component of the inverter output voltage is varied by varying the B level as a function of the amplitude command signal $V_C$. In FIG. 14 this is accomplished by a function generator 141 connected between the amplitude command signal line 35 and the B level line 134. This component is preferably constructed and arranged so that the B level is related to the value of $V_C$ in accordance with the graph displayed in the block 141 in FIG. 14, whereby the amplitude of the fundamental output voltage will vary substantially linearly with $V_C$ when the transition PWM mode implementing means is active. When $V_C$ is zero the B level has its maximum magnitude which is selected to be approximately 0.866 per unit of the constant amplitude $V_R$ as determined by the fixed reference 86 in FIG. 12 (whereby $\beta$ has a maximum angle of approximately 60°), and a $V_C$ increases to its maximum value (1.0 per unit), the B level is decreased to zero. At the aforesaid reference value of $V_C$ (e.g, 0.67 per unit), the B level has a magnitude that results in the fundamental component of the inverter output voltage having the same amplitude as it would have at this magnitude of $V_C$ if the triangle interception PWM mode implementing means 71 were active.

Further in accordance with the present invention, a function generator 142 is included between the lines 133 and 134 so as to vary the A level as a function of the B level in a manner that will minimize selected harmonics of the inverter output voltage. The relationship between these quantities is preferably that shown by the graph in the block 142 in FIG. 14, which relationship is intended to yield the functional relationship between $\alpha$ and $\beta$ that is displayed in FIG. 9 for reducing peak harmonic currents in the a-c motor load 23 as previously explained.

Both of the function generators 141 and 142 can be implemented by using components and circuits well known in the art, and the particular components and circuits selected for this purpose are a matter of design choice. Various techniques for designing function generators are disclosed, by way of example, on pages 482 et seq. of the book Analog Computation by Albert S. Jackson (McGraw-Hill Book Co., Inc., N.Y., N.Y. 1960).

The transition PWM mode implementing means 72 of the present invention includes additional means which is operative to eliminate the main thyristor pair switching moments listed first and last in the above schedule in response to the A level decreasing to a predetermined low magnitude attained when the B level is near the opposite ends of its range of variations shown in the block 142 in FIG. 14. This additional means comprises a comparer 143 having one input connected to the A level line 133 and a second input connected to a reference or bias signal terminal 144. The reference signal at terminal 144 is given a fixed magnitude equal to the aforesaid low magnitude of A, which magnitude preferably is related to the constant amplitude of the sine wave reference signals on the input lines 94–96 by the sine of an electrical angle whose time duration, at the fundamental frequency of the voltage exciting the stator windings of the motor 23 when running at its predetermined reference speed, is approximately equal to the minimum permissible pulse width (i.e., the minimum safe interval between consecutive switching moments, as was previously explained). For example, if a reference frequency of 50 Hz were assumed, a minimum pulse width of 300 microseconds corresponds to an angle of 5.4° and the sine of this angle is 0.094. In FIG. 14 the reference magnitude at the terminal 144 is indicated as 0.1 per unit, and the output state of the comparer 143 will be high ("1") when the per unit magnitude of the A level on line 133 is equal to or less than this number.

The output of the comparator 143 determines the state of the supervising signal $D_A$ on the line 138 to which it is coupled by way of a D type flip flop 145. In the logic units 137 a "1" signal on line 138 will override any "0" periods in the output signal received from the $V_R$/A level comparer 131. This is illustrated in FIG. 17 where the state of the output signal (X) produced by the logic A unit during the intervals labeled 3' and 4' (corresponding to the intervals 3 and 4 except that $D_A$ is assumed to be a "1") is seen to be the same as during the intervals 2 and 5, respectively. However, during each of the intervals 1, 2, 5, and 6 when $A_A = 1$, a $D_A = 1$ signal on line 138 will not change the output signal (X) from that shown in the Logic A Truth Table of FIG. 17. With only the B level in effect, the number of pulses per half cycle of the rectified reference signal $V_R$ is reduced to three, with the width of the first and third pulses corresponding to $\beta$.

The D type flip flop 145 is provided to prevent the supervising signal $D_A$ from changing states except during predetermined intervals which are spaced from the zero crossings of any of the sine wave reference signals on lines 94–96 by at least the arscine of the predetermined low per unit reference magnitude (e.g., 0.1) of the A level. Toward this end, the clock input C of the flip flop 145 is connected to the line 129 so as to receive the recurring clock pulses 130 which the peak detecting means 128 derives from the first sine wave reference signal on line 94. It will be apparent that when the output state of the comparer 143 changes from "0" to "1" due to the A level decreasing to its predetermined low reference magnitude (e.g. 0.1 per unit), the flip flop 145 does not initially operate to make $D_A = 1$ until triggered by the next one of the clock pulses 130 to be received. The subsequent return of the flip flop 145 to its inoperative state ($D_A = 0$) is similarly synchronized with the clock pulse next occurring after the comparer 143 switches its output from "1" to "0" in response to the A level increasing from its low reference magnitude to a larger magnitude. As is illustrated in FIG. 14, the clock pulses 130 are each displayed by 90° from the zero crossings of the first sine wave reference signal and by 30° from the zero crossings of both the second and third reference signals on lines 95 and 96, respectively, which angles provide ample assurance that the supervising $D_A$ will not change state during periods spanning such zero crossings in either direction by at least the arcsine of the per unit reference magnitude of the A level. This will avoid undesirable perturbations of motor current due to the fundamental output voltage of the inverter shifting in phase with respect to the fundamental back emf of the motor. Such a phase shift could occur if $D_A$ were to change state during the forbidden period.

The transition PWM mode implementing means 72 of the present invention also includes means for eliminating the switching moments listed second and next to last in the above schedule when the B level is equal to or smaller than a predetermined low magnitude. The latter means is similar to the above-described additional means 143, 145, and in FIG. 14 it is seen to comprise a second comparator 146 and another D type flip flop 148. The comparer 146 has one input connected to the B level line 134 and a second input connected to a reference or bias signal terminal 147. The reference signal at terminal 147 is given a fixed magnitude equal to the aforesaid low magnitude of B, which magnitude corresponds to a predetermined value of $\beta$ closely approaching 0°. Preferably this predetermined value of $\beta$ is approximately equal to the angle (e.g., 5.4°) whose time duration, at an excitation frequency which is equivalent to the predetermined reference speed of the motor, equals the minimum permissible pulse width. As is indicsted by way of example in FIG. 14, the per unit reference magnitude chosen for the B level is the same as that of the A level (e.g. 0.1). It can be observed in FIG. 9 that $\alpha$ will attain a value (e.g. 5.74°) equal to the arcsine of the chosen reference level as $\beta$ decreases to a small angle about twice as large as this value. The particular reference magnitude which is selected in accordance with the present teachings will ensure that the means for eliminating switching moments is operative any time the called for value of $\beta$ (or $\alpha$) has a time duration shorter than the minimum permissible pulse width, a condition in which the above-mentioned lockout means would otherwise cause an untoward phase shift in the fundamental waveform of the inverter output voltage.

The output state of the comparer 146, which is high ("1") when the B level on line 134 is equal to or smaller than its predetermined low per unit reference magnitude, determines the state of the supervising signal $D_B$ on the line 139 to which it is coupled by way of the D type flip flop 148. In the logic units 137 a "1" signal on line 139 will override any "0" periods in the output signals received from the $V_R$/B level comparer 132 and the $V_R$/A level comparer 131. Consequently the state of the output signal (X) which is produced by the logic A unit will be the same as that of the rectangular waveform signal $S_A$ whenever $D_B = 1$. In FIG. 17 this has been illustrated specifically for the intervals labeled 2' and 5' (corresponding to the intervals 2 and 5 except that $D_B$ is assumed to be a "1"). There is now only one pulse per half cycle of the rectified reference signal $V_R$, and square wave operation is realized.

The clock input C of the flip flop 148 is connected to the line 129 so as to receive the aforesaid pulses 130. The operation of the flip flop 148 is the same as that of the previously described flip flop 145, and consequently this component is effective to prevent the supervising signal $D_B$ on line 139 from changing states except during predetermined intervals which are spaced from the zero crossings of any of the sine wave reference signals on lines 94–96 by at least the arcsine of the per unit reference magnitude of the B level.

In a preferred embodiment of the present invention, the transistion PWM mode implementing means 72 includes suitable means for limiting the minimum level of each of the variable A and B level signals to a magnitude which is substantially the same as the aforesaid predetermined low magnitude thereof. This desirably prevents the comparers 131 and 132 from changing states during a period spanning the predetermined first switching moment (i.e., the zero crossings of the sine wave reference signal on the associated one of the input lines 94, 95, or 96) by the electrical angle whose time duration at the reference frequency, coincides to the minimum permissible pulse width. Without such limits there is a possibility that as either the A or the B level signal falls below its predetermined low magnitude the comparer 131 or 132 will operate during the forbidden period prior to operation of the corresponding D type flip flop 145 or 148 which is waiting for the next clock pulse 130, in which case the aforesaid lockout means would cause an untoward phase shift in the fundamental waveform of the inverter output voltage. The risk of such premature operation of the comparers 131 and 132 is especially high on the occasion of any rapid or abrupt reduction to zero in the value of the amplitude command signal $V_C$.

Figure 15:
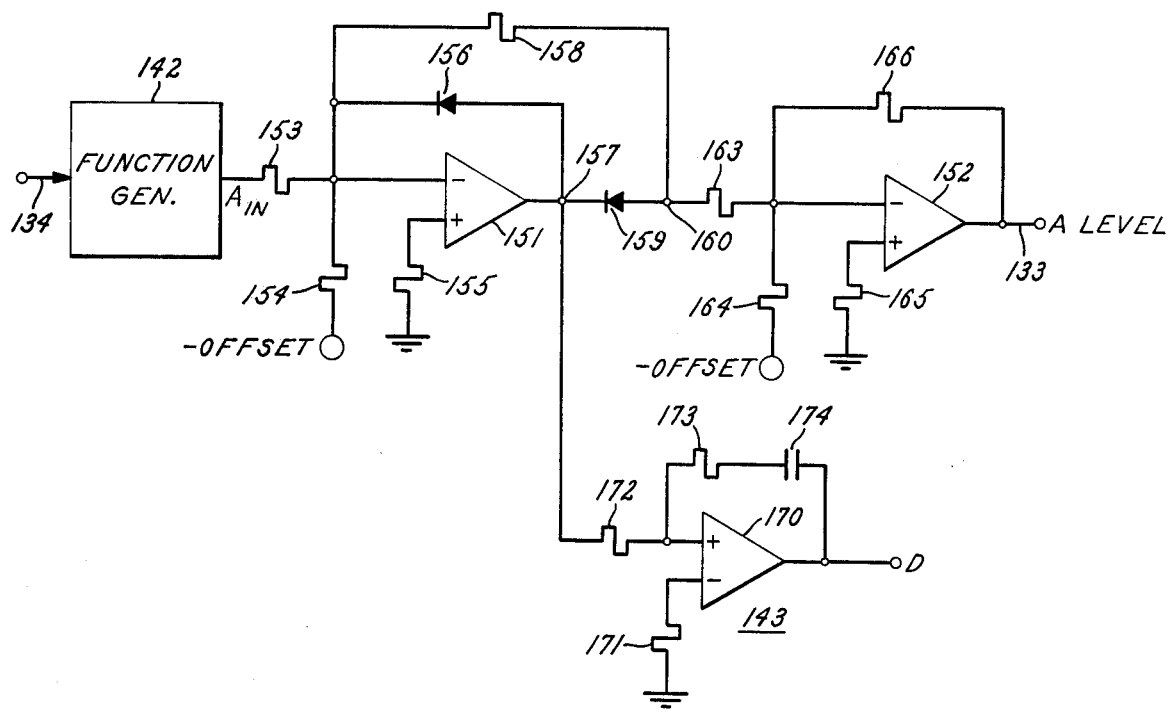
FIG. 15 is a schematic diagram of a presently preferred circuit for establishing a minimum value of the A level indicated in FIG. 14.

One scheme for limiting the A level has been illustrated in FIG. 15 where it is seen to comprise first and second operational amplifiers 151 and 152 connected in tandem between the A level line 133 and the function generator 142. The inverting input terminal of the first operational amplifier 151 is connected to the junction of two resistors 153 and 154 which in turn are serially connected between the output of the function generator 142 and a bias or "offset" terminal of predetermined relatively negative potential. The output signal from the function generator 142 serves as the input signal $A_{IN}$ for the scheme shown in FIG. 15, with a fixed offset signal being subtracted therefrom. The non-inverting terminal of the operational amplifier 151 is connected to the common potential bus (shown grounded) via a resistor 155, and a diode 156 is disposed between the output terminal 157 and the inverting input terminal of the amplifier 151. The anode of the diode 156 and the terminal 157 are interconnected so that the signal on the latter terminal is clamped at a slightly positive value whenever the input signal $A_{IN}$ is less positive than a certain reference or threshold level which depends on the ratio of the ohmic resistance values of the resistors 153 and 154. Paralleling the diode 156 is a feedback path comprising a resistor 158 in series with another diode 159 whose cathode is connected to the output terminal 157, and therefore the signal at the terminal 157 will have relatively negative polarity and a magnitude that varies with the input signal $A_{IN}$ when the latter is more positive than the aforesaid threshold level.

Figure 16:
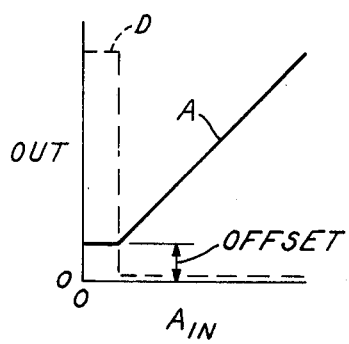
FIG. 16 is a graph of the output signals (A and D) vs. the input signals ($A_{IN}$) of the circuit shown in FIG. 15.

The inverting input terminal of the second operational amplifier 152 is connected to the junction of two resistors 163 and 164 which are serially connected between the anode terminal 160 of the diode 159 and another "offset" terminal having the aforesaid predetermined negative potential. Parameters are selected so that the ratio of the resistance of resistor 163 to the resistance of resistor 164 is equal to the ratio of the resistance of resistor 158 to the resistance of resistor 154. Another resistor 165 is connected between ground and the non-inverting terminal of the operational amplifier 152, and a feedback path comprising a resistor 166 is connected between the output (line 133) and the inverting input of this amplifier. So long as the signal at terminal 160 is equal to or more positive than ground, the signal on line 133 has a minimum value which is offset from zero by a fixed amount as determined by the predetermined "offset" potential and the ratio of the resistance of resistor 166 to the resistance of resistor 164, but whenever there is a relatively negative signal at terminal 160 the offsets of the respective amplifier 151 and 152 cancel one another and the signal on line 133 will vary directly with the input signal $A_{IN}$. The resulting relationship between the A level output signal on line 133 and the input signal $A_{IN}$ is displayed in FIG. 16.

Parameters are preferably selected so that the aforesaid minimum value of A is equivalent to the predetermined low per unit reference magnitude (e.g., 0.1) of the A level at which the supervising signal $D_A$ on line 138 (FIG. 14) changes state. Consequently in FIG. 15 a signal for the input D of the flip flop 145 is readily obtained by utilizing for the comparer 143 a third operational amplifier 170 having an inverting terminal connected through a resistor 171 to ground and a non-inverting terminal connected through a resistor 172 to the output terminal 157 of the first operational amplifier 151. The third operational amplifier 170 is operative to produce a high output signal at terminal D so long as the signal at terminal 157 is relatively positive, but it will switch to an inoperative state (low output signal) in response to the negative signal that results at terminal 157 when the input signal $A_{IN}$ rises above the aforesaid threshold level so as to increase the A level from its minimum value to a larger value. The output and the non-inverting input of the operational amplifier 170 are interconnected by positive feedback means comprising a resistor 173 in series with a capacitor 174, and in response to each abrupt change of state of the signal at D this positive feedback means performs a transient latching function similar to that described above in connection with the comparers 97 and 101 associated with the actuating mechanism 74 of the mode changing means shown in FIG. 12. For example, the positive feedback means 173, 174 will be effective once the output switches from a D = 1 condition to a D = 0 state for maintaining the operational amplifier 170 in the latter state for at least several cycles of the fundamental frequency. Similarly, when the FIG. 15 circuit is operative to change the D output from "0" to "1", the positive feedback means is again effective to sustain this operative condition for at least the same length of time. This will ensure an oscillation-free transition between dual and single d-c level set modes of PWM.

The FIG. 15 scheme or its equivalent is advantageous because it ensures that on transitioning between square-wave and transition PWM modes of inverter operation the elimination or addition of per cycle switching moments is determined solely by operation of the comparer 143 (or 146) and the D type flip flop 145 (or 148) and is not influenced by the A (or B) level varying in a range of values between zero and its predetermined minimum. As was previously explained, the latter possibility should be avoided because it could result in the lockout means causing improperly timed switching during intervals spaced from the zero crossings of the sine wave reference signals by less than the aforesaid predetermined low value of $\alpha$ (or $\beta$) and because it does not have the benefit of a-c hysteresis.

While a preferred form of the invention has been shown and described by way of illustration, many modifications will occur to those skilled in the art. For example, although the periodic reference signal which keys the transition PWM mode implementing means has been disclosed as having a sinusoidally undulating magnitude, this specific reference waveform is not essential and can be replaced by any periodic pattern which is frequency modulated. By way of further example, the A level could be derived directly from the amplitude command signal $V_C$ rather than from the B level signal as has been shown herein. Obviously gate turn off devices or power transistors or other equivalent devices could be used in lieu of the thyristors and their commutating circuits that have been shown in the presently preferred embodiment of the inverter 22. It is contemplated therefore by the concluding claims to cover all such modifications as fall within the true spirit and scope of the invention.

What I claim as new and desire to secure by Letters Patent of the United States is:

1. Improved static electric power apparatus having relatively positive and negative d-c input terminals adapted to be connected to a source of voltage, a plurality of a-c output terminals adapted to be connected to a variable frequency alternating current load, and means for connecting each of said output terminals to both of said input terminals in a manner to convert unipolarity voltage applied to said input terminals into alternating voltage at said output terminals, said connecting means comprising at least one pair of alternately conducting controllable electric valves interconnecting one of said output terminals and the respective input terminals of said apparatus, firing and commutating means for periodically switching the conducting states of said valves, and means responsive to frequency and amplitude command signals for controlling the operation of said firing and commutating means so as to vary, as functions of said command signals, the frequency and the amplitude of the fundamental component of said alternating voltage, wherein the control means includes:

a. first means responsive to said frequency command signal for generating a periodic reference signal having a frequency which depends on said frequency command signal;

b. second means keyed by said reference signal for causing said firing and commutating means to switch the conducting states of said valves at certain moments during each cycle of the fundamental component of said alternating voltage, the timing of a predetermined first switching moment in each half cycle of said fundamental component of voltage being established by said reference signal and any subsequent switching moments in the same half cycle occurring in accordance with a schedule comprising at least:

i. a moment following said first switching moment by a variable angle alpha ($\alpha$) measured in electrical degrees of a full cycle of fundamental voltage, ii. a moment following said first switching moment by another variable angle beta ($\beta$) measured in electrical degrees of a full cycle of fundamental voltage, $\beta$ being larger than $\alpha$ but less than 90°, iii. A moment occurring 180° -$\beta$ after said first switching moment, and iv. a moment occurring 180° -$\alpha$ after said first switching moment;

c. third means for varying $\alpha$ as a function of $\beta$ so as to minimize selected harmonics of said alternating voltage; and d. fourth means for varying $\beta$ as a function of said amplitude command signal to thereby vary the amplitude of the fundamental voltage component.

2. The improved control means as set forth in claim 1 wherein $\alpha$ increases with $\beta$ for values of $\beta$ less than a predetermined angle and decreases as $\beta$ increases for values of $\beta$ greater than said predetermined angle.

3. The improved control means of claim 2 in which $\alpha$ is approximately two-thirds of $\beta$ when $\beta$ equals said predetermined angle.

4. The improved control means of claim 2 in which said amplitude command signal is variable between values of 0 and 1.0 per unit, the value of $\beta$ is decreased from a predetermined maximum angle to a predetermined minimum angle as said amplitude command signal varies from 0 to approximately 1.0 per unit, and $\alpha$ has a predetermined minimum value which is attained as $\beta$ decreases to a predetermined small angle larger than its minimum angle and as $\beta$ increases to a predetermined large angle smaller than its maximum angle.

5. The improved control means as set forth in claim 4 including additional means operative when α equals its minimum value for eliminating the switching moments listed first and last in said schedule, said additional means including means responsive to said reference signal for preventing an initial operation thereof except during predetermined intervals which are spaced from said predetermined first switching moment by at least said minimum value of α.

6. The improved control means as set forth in claim 1 including additional means operative when α is equal to or smaller than a predetermined value closely approaching 0° for eliminating the switching moments listed first and last in said schedule, said additional means including means responsive to said reference signal for preventing an initial operation thereof except during predetermined intervals which are spaced from said predetermined first switching moment by at least said predetermined value.

7. The improved control means of claim 6 in which said predetermined intervals recur during successive half cycles of fundamental voltage approximately 90° after said predetermined first switching moment.

8. The improved control means of claim 6 in which said additional means includes means for sustaining its operation, once initiated, for at least a predetermined length of time.

9. The improved control means of claim 8 in which said additional means switches from its operative condition to an inoperative state in response to α increasing from said predetermined value to a larger value and said operation sustaining means is also effective once said additional means switches to said inoperative state to sustain this state for at least said predetermined length of time.

10. The improved control means as set forth in claim 6 including means operative when β is smaller than said predetermined value closely approaching 0° for eliminating the switching moments listed second and next to last in said schedule, and means responsive to said reference signal for preventing an initial operation of said last-mentioned means except during intervals spaced from said predetermined first switching moment by at least said predetermined value.

11. The improved control means of claim 1 in which said reference signal has an undulating magnitude, and said second means comprises first comparing means responsive to the magnitude of said reference signal and to the level of a first variable bias signal for initiating the switching moments listed first and last in said schedule and second comparing means responsive to the magnitude of said reference signal and to the level of a second variable bias signal for initiating the second and the next to last switching moments in said schedule, the level of said first bias signal being varied as a function of the level of said second bias signal so as to minimize said selected harmonics, and the level of said second bias signal being greater than that of said first bias signal and being varied as a function of said amplitude command signal to thereby vary the amplitude of the fundamental voltage component.

12. The static electric power apparatus as set forth in claim 1 wherein said variable frequency alternating current load comprises at least one a-c motor, the value of said amplitude command signal is variable between 0 and 1.0 per unit, and the control means further includes means for implementing a triangle interception mode of pulse width modulation of the alternating voltage at said output terminals and mode changing means responsive to the speed of said motor and to the value of said amplitude command signal for activating said triangle interception mode implementing means when the speed of said motor does not exceed a predetermined reference speed and said amplitude command signal does not exceed a predetermined reference value, said mode changing means being alternatively effective to activate said second means when the motor speed exceeds said reference speed or said amplitude command signal exceeds said reference value.

13. The improved control means of claim 12 in which said predetermined reference value of said amplitude command signal is less than 1.0 per unit.

14. The improved control means of claim 12 in which said mode changing means includes means for preventing for at least a predetermined length of time the reactivation of said triangle interception mode implementing means once said mode changing means has effected activation of said second means.

15. The static electric power apparatus as set forth in claim 12 wherein said third means is designed to vary α as that function of β which will reduce peak harmonic current in the a-c motor.

16. The apparatus as set forth in claim 12 wherein a-c power is supplied from said source to said motor during motoring operation of the apparatus and its connected load, said amplitude command signal varies from 0 to 1.0 per unit during the motoring operation as the motor accelerates from rest to a predetermined corner point speed so as to maintain the motor flux substantially constant for speeds lower than said corner point speed, said predetermined reference value of said amplitude command signal is less than 1.0 per unit, and said predetermined reference speed is over said corner point speed.

17. The static electric power apparatus as set forth in claim 1 wherein said variable frequency alternating current load comprises at least one a-c motor and said third means is designed to vary α as that function of β which will reduce peak harmonic current in the motor.

18. Improved static electric power apparatus having relatively positive and negative d-c input terminals adapted to be connected to a source of voltage, a plurality of a-c output terminals adapted to be connected to a variable frequency alternating current load, and means for connecting each of said output terminals to both of said input terminals in a manner to convert unipolarity voltage applied to said input terminals into alternating voltage at said output terminals, said connecting means comprising at least one pair of alternately conducting controllable electric valves interconnecting one of said output terminals and the respective input terminals of said apparatus, firing and commutating means for periodically switching the conducting states of said valves, and means responsive to frequency and amplitude command signals for controlling the operation of said firing and commutating means so as to vary, as functions of said command signals, the frequency and the amplitude of the fundamental component of said alternating voltage, wherein the control means includes:
 a. first means responsive to said frequency command signal for generating a periodic reference signal having a frequency which depends on said frequency command signal;
 b. second means keyed by said reference signal for determining the consecutive moments during each cycle of the fundamental component of said alternating voltage at which the control means causes said firing and commutating means to switch the conducting states of said valves, the timing of a first switching moment in each cycle being established by said reference signal, a subsequent switching moment occurring one-half cycle later, and additional switching moments occurring after said first moment at variable angles measured in electrical degrees of a cycle of fundamental voltage, the per-cycle schedule of said additional switching moments comprising:

i. a moment following said first switching moment by a variable angle beta ($\beta$), ii. an immediately succeeding moment occuring $180° - \beta$ after said first moment, iii. a moment following said subsequent switching moment by the same angle $\beta$, and iv. another moment occurring $180° - \beta$ after said subsequent moment;

c. third means for varying $\beta$ between predetermined maximum and minimum angles as a function of said amplitude command signal to thereby vary the amplitude of the fundamental voltage component; and d. fourth means operative when $\beta$ is equal to or smaller than a predetermined value closely approaching 0° for eliminating the above-listed additional switching moments from said per-cycle schedule;

e. said fourth means including means responsive to said reference signal for preventing an initial operation thereof except during predetermined intervals which are spaced from said first and said subsequent switching moments by at least said predetermined value.

19. The improved control means of claim 18 in which said fourth means includes means for sustaining its operation, once initiated, for at least a predetermined length of time.

20. The improved control means of claim 19 in which said fourth means switches from its operative condition to an inoperative state in response to $\beta$ increasing from said predetermined value to a larger value and said operation sustaining means is also effective, once said fourth means switches to said inoperative state, to sustain this state for at least said predetermined length of time.

21. The improved control means of claim 18 in which said fourth means switches from its operative condition to an inoperative state in response to $\beta$ increasing from said predetermined value to a larger value, and in which said fourth means includes means for maintaining it in said inoperative state, once switched to this state, for at least a predetermined length of time.

22. The improved control means of claim 18 in which said predetermined minimum angle is substantially the same as said predetermined value of $\beta$.

23. The static electric power apparatus as set forth in claim 18 wherein said variable frequency alternating current load comprises at least one a-c motor and the control means further includes means for implementing a triangle interception mode of pulse width modulation of the alternating voltage at said output terminals and mode changing means responsive to the speed of said motor and to the value of said amplitude command signal for activating said triangle interception mode implementing means so long as said amplitude command signal does not exceed a predetermined reference value and the speed of said motor does not exceed a predetermined reference speed, said mode changing means being alternatively effective to activate said second means whenever said amplitude command signal exceed said reference value or said motor speed exceeds said reference speed.

* * * * *